(12) United States Patent
Willing et al.

(10) Patent No.: US 9,458,303 B1
(45) Date of Patent: Oct. 4, 2016

(54) RECYCLING OF STYRENE BUTADIENE RUBBER AND LIKE MATERIALS

(71) Applicant: University of Louisville Research Foundation, Inc., Louisville, KY (US)

(72) Inventors: Gerold A. Willing, Louisville, KY (US); Patrick Kroeger, Louisville, KY (US)

(73) Assignee: UNIVERSITY OF LOUISVILLE RESEARCH FOUNDATION, INC., Louisville, KY (US)

( * ) Notice: Subject to any disclaimer, the term of this patent is extended or adjusted under 35 U.S.C. 154(b) by 183 days.

(21) Appl. No.: 14/560,614

(22) Filed: Dec. 4, 2014

Related U.S. Application Data

(60) Provisional application No. 61/911,546, filed on Dec. 4, 2013.

(51) Int. Cl.
| | |
|---|---|
| *C08J 11/04* | (2006.01) |
| *C08J 11/16* | (2006.01) |
| *B01J 8/08* | (2006.01) |
| *C08F 6/00* | (2006.01) |

(52) U.S. Cl.
CPC ............... *C08J 11/16* (2013.01); *B01J 8/082* (2013.01); *B01J 2208/00548* (2013.01); *B01J 2208/00893* (2013.01); *C08J 2309/06* (2013.01)

(58) Field of Classification Search
CPC ..................................... C08J 2321/00
USPC ............................. 521/40, 41, 42; 528/501
See application file for complete search history.

(56) References Cited

PUBLICATIONS

Park et al. Depolymerization of Styrene-Butadiene Copolymer in Near-Critical and Supercritical Water; Ind. Eng. Chem. Res. 2001, 40, 756-767.*
AWWA Research Foundation; Performance of Elastomeric Components in Contact with Potable Water; Public Report; 2007; pp. 1-336; www.awwarf.org; Colorado, USA. [NPL is broken into 3 PDF's for size].
American Water Works Association; Investigating the Effects of Chloramines on Elastomer Degradation; Journal; Aug. 1993; pp. 101-111; vol. 85; No. 8; American Water Works Association; http://www.jstor.org/stable/41294784.

* cited by examiner

*Primary Examiner* — Terressa Boykin
(74) *Attorney, Agent, or Firm* — Wyatt, Tarrant & Combs, LLP; Stephen C. Hall

(57) ABSTRACT

Present embodiments provide efficient and cost-effective use of chloramines such as monochloramine, $NH_2Cl$, to degrade styrene butadiene rubber, a material from which tires and other products are made, so that it can be recycled, and do so by overcoming the limitations of monochloramine due to its thermodynamic instability by achieving and maintaining adequate monochloramine concentrations for the degrading process.

20 Claims, 20 Drawing Sheets

FIGURE 1
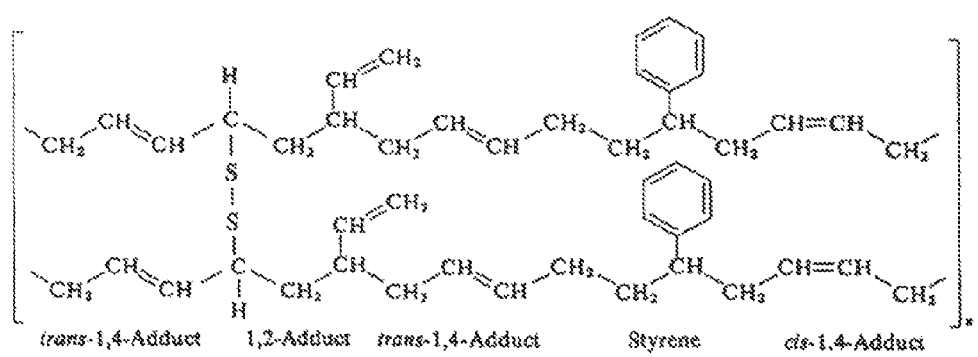
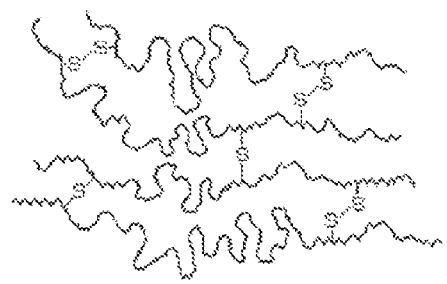
FIGURE 2

FIGURE 3 – Concentration of Chloramine Changing with Time
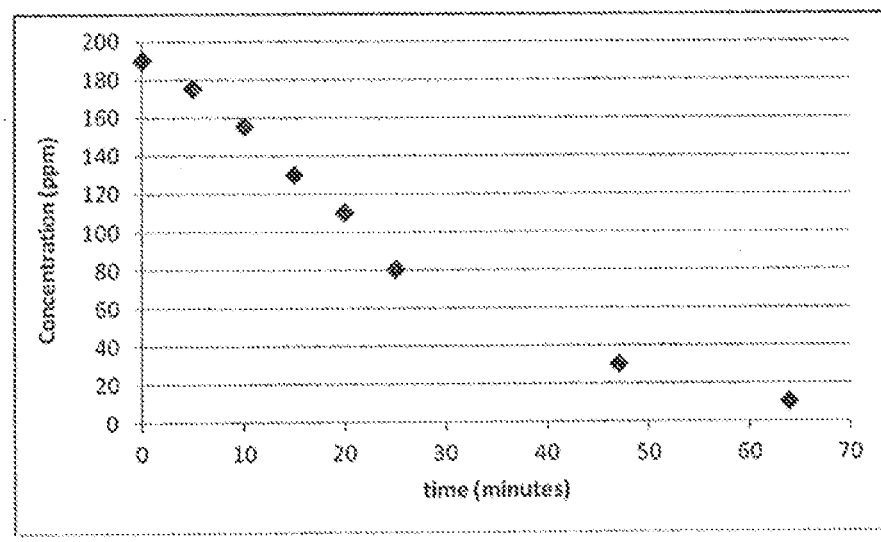
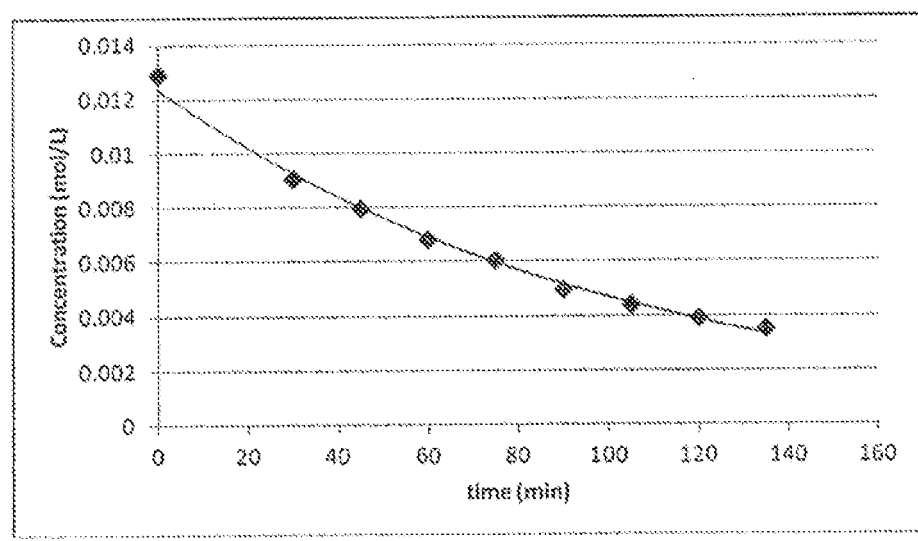
FIGURE 4 – Monochloramine Decomposition Profile

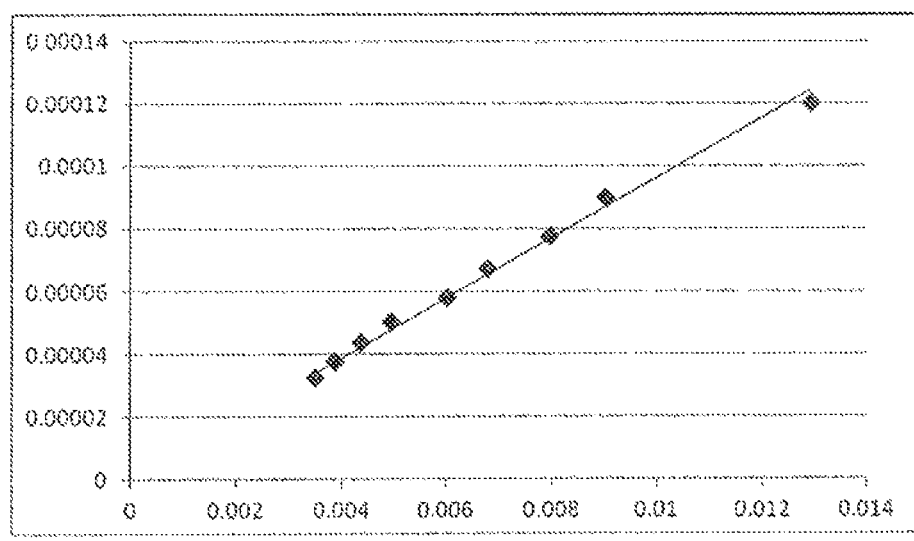
FIGURE 5 – Determination of Reaction Order and Rate Constant

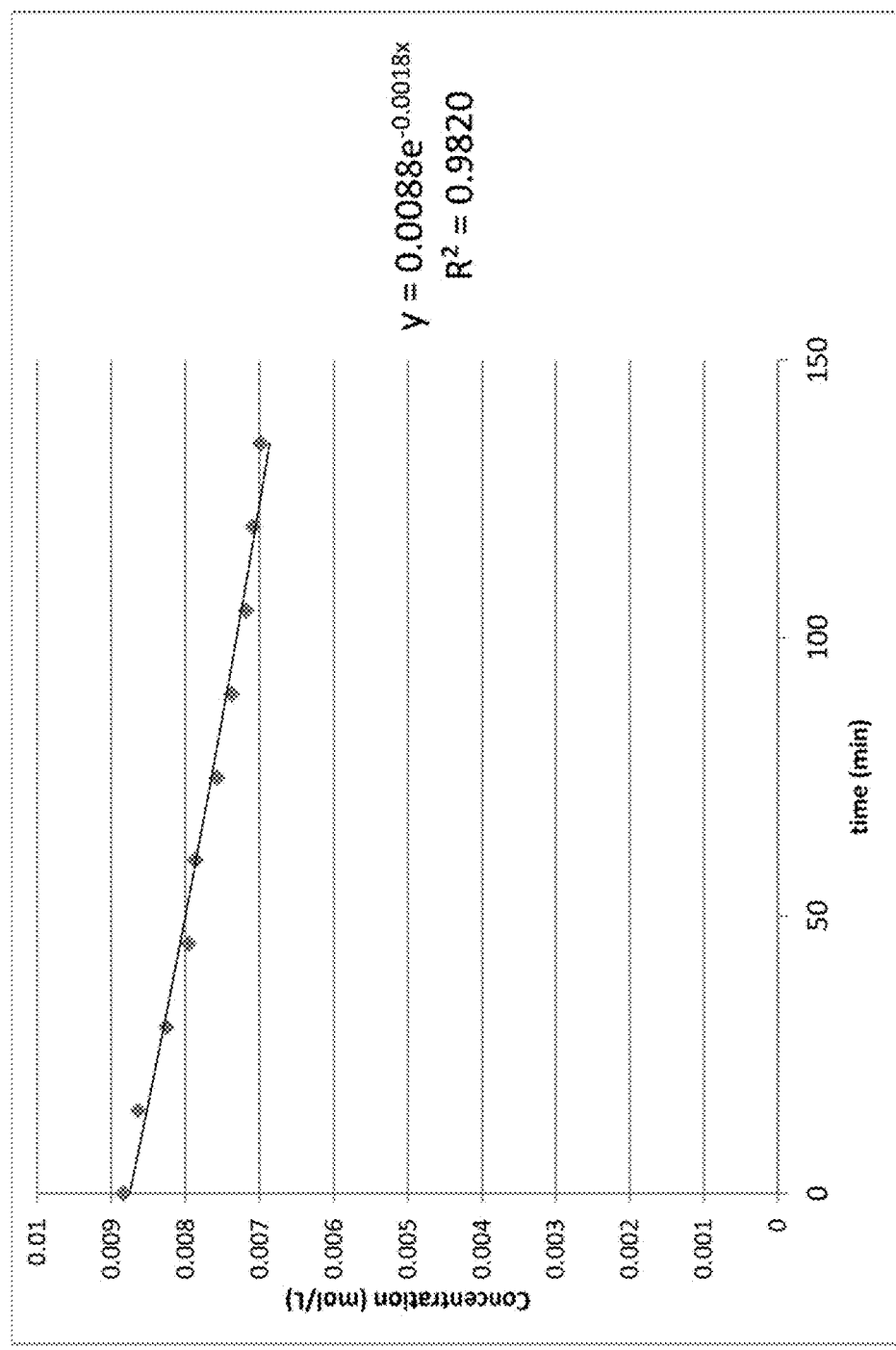
Figure 6A – Concentration vs. Time 45 C With Rubber

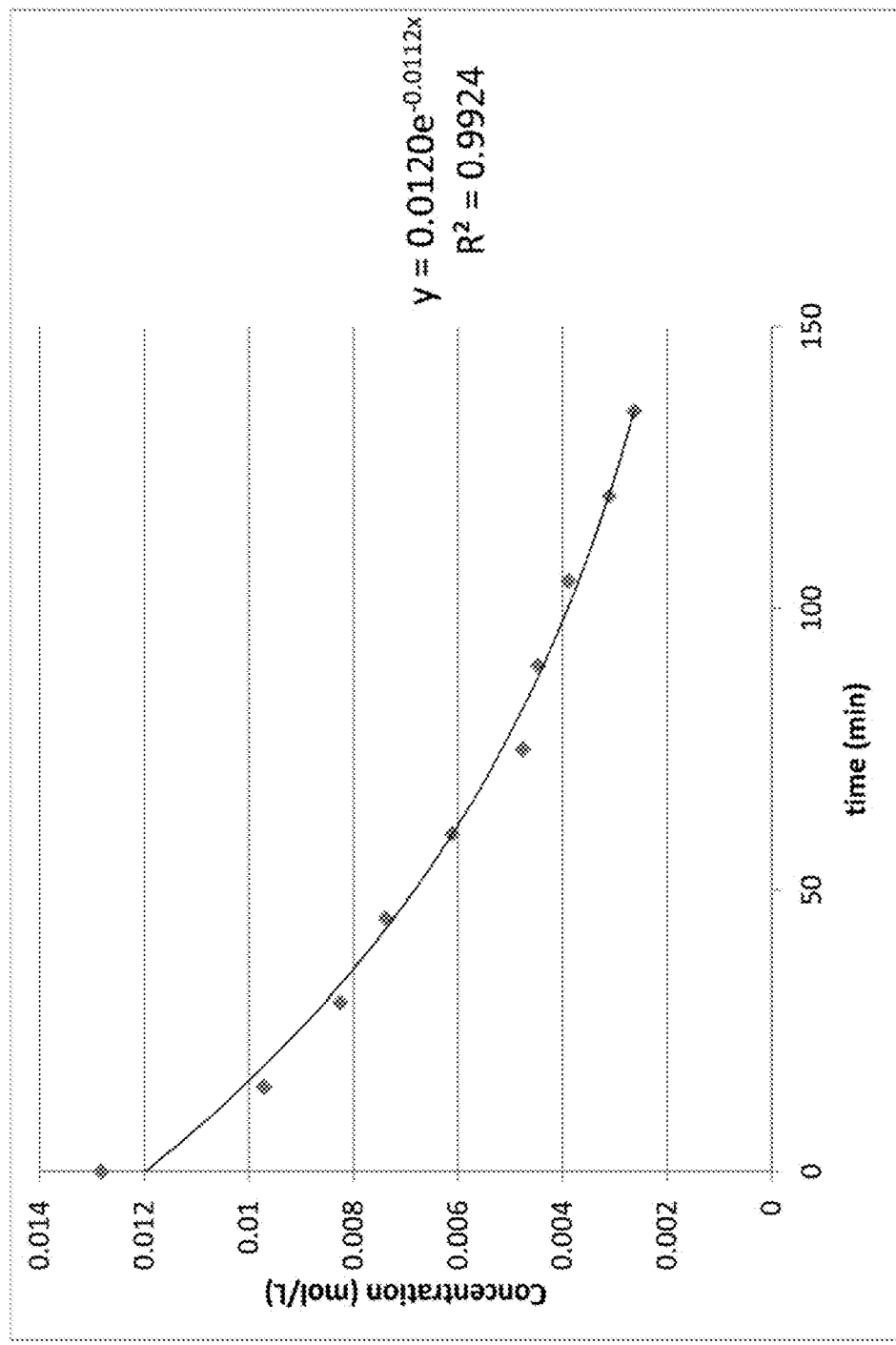
Figure 6B – Concentration vs. Time 70 °C With Rubber

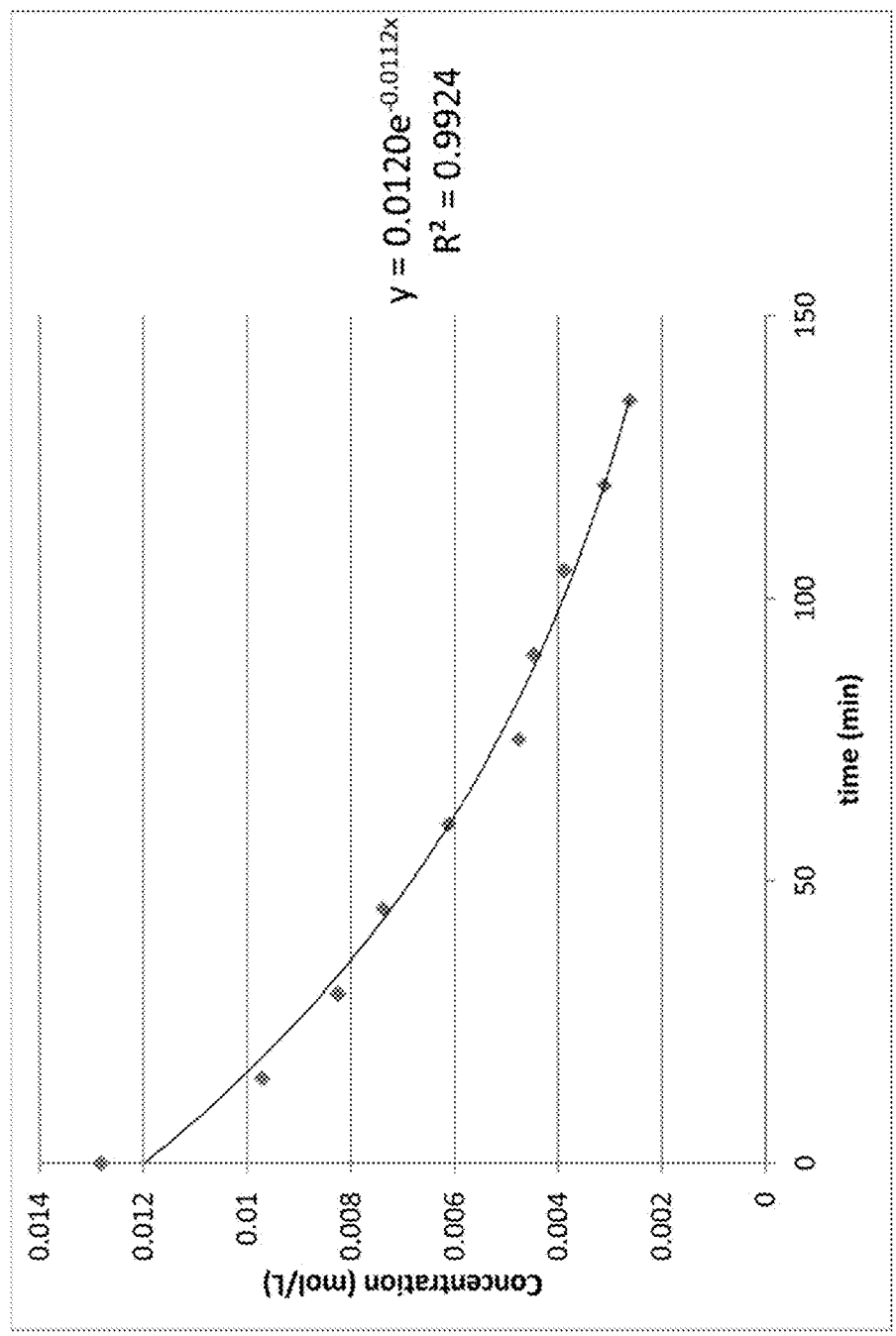
Figure 6C – Concentration vs. Time 70 °C Without Rubber

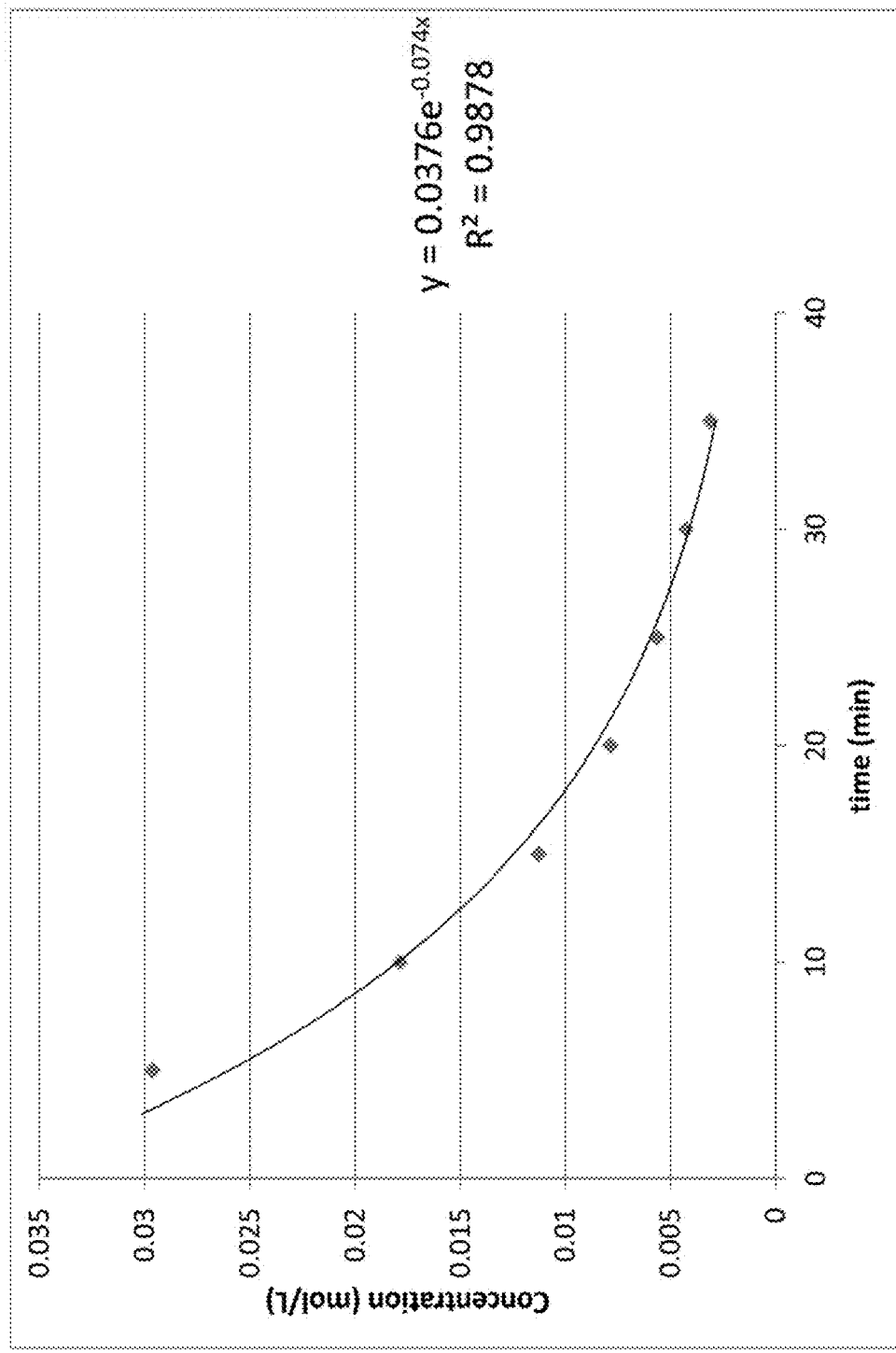
Figure 6D – Concentration vs. Time 92 °C Without Rubber

FIGURE 6E – Reaction Rate vs. Concentration 45 °C With Rubber
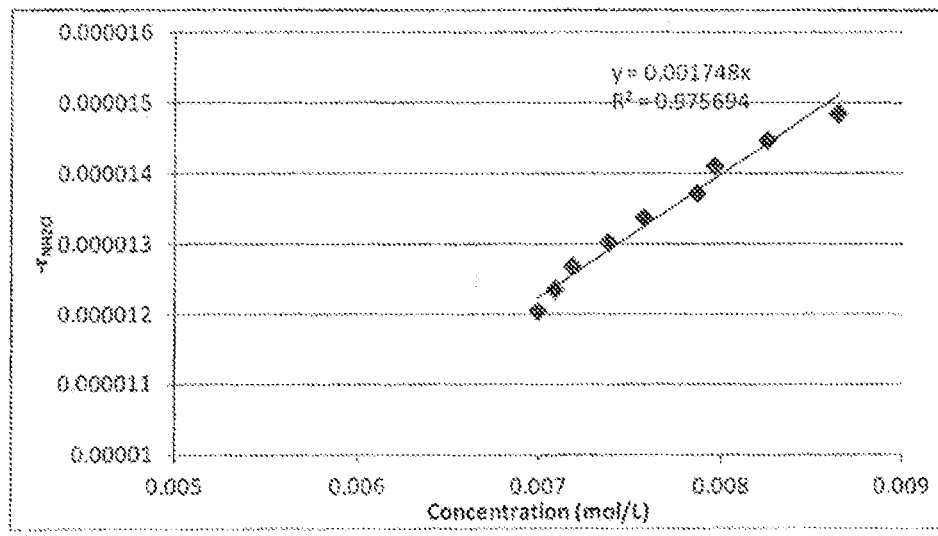
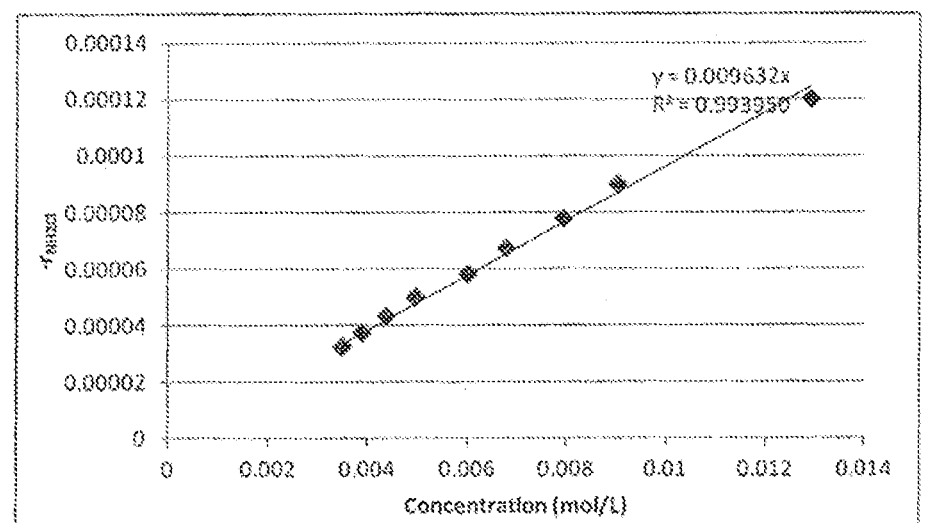
FIGURE 6F – Reaction Rate vs. Concentration 70 °C With Rubber

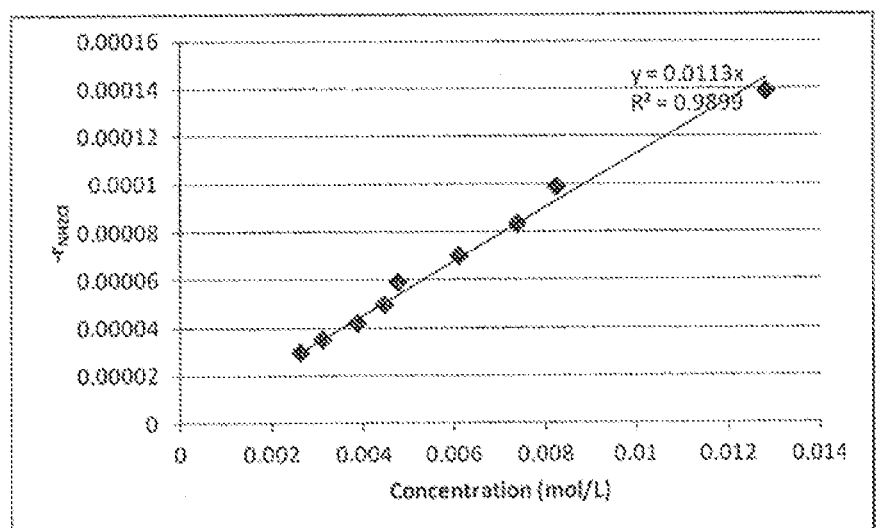
FIGURE 6G – Reaction Rate vs. Concentration 70 °C Without Rubber
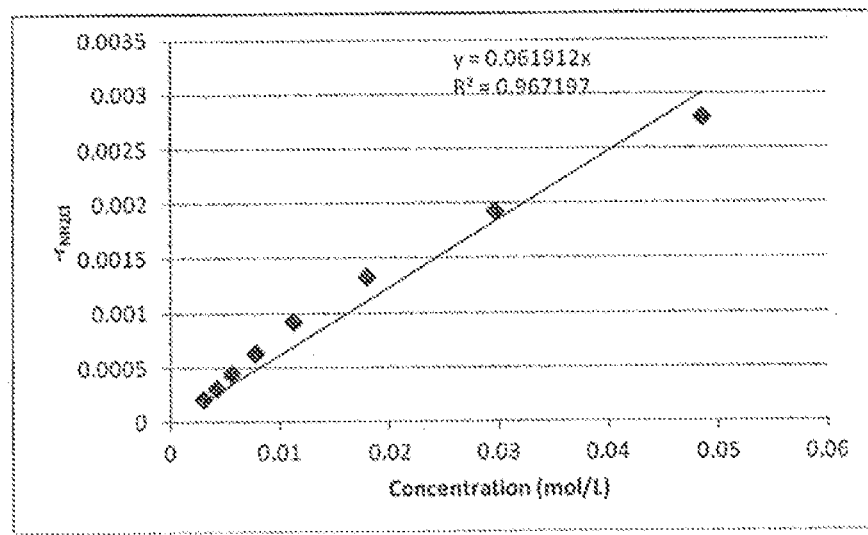
FIGURE 6H – Reaction Rate vs. Concentration 92 °C With Rubber FIGURE 9
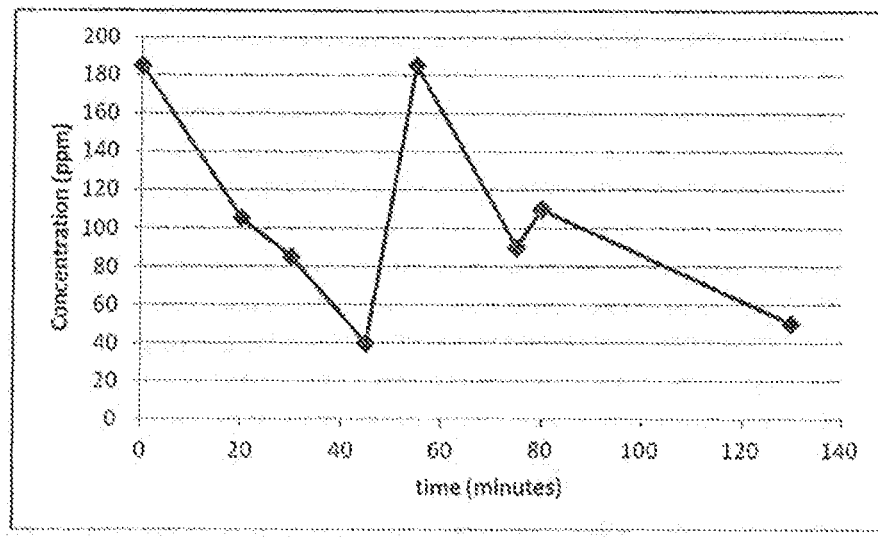
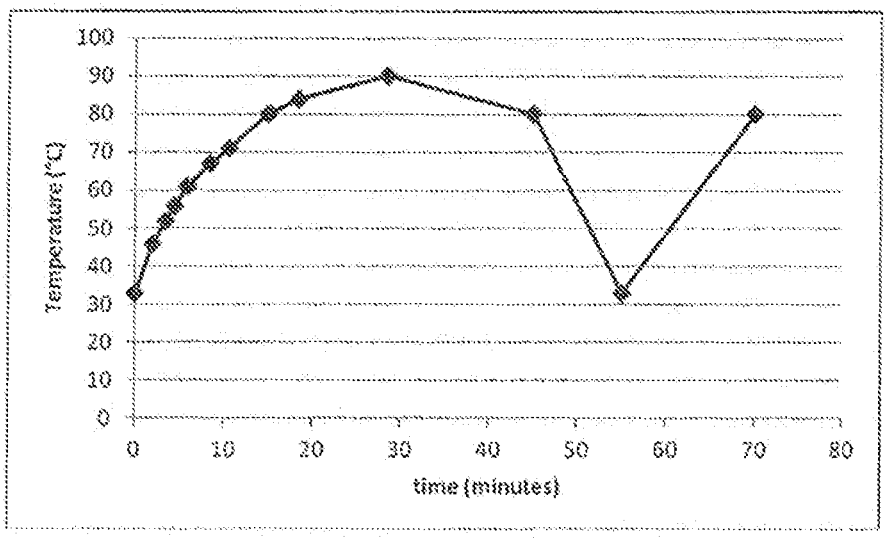
FIGURE 10

FIGURE 11
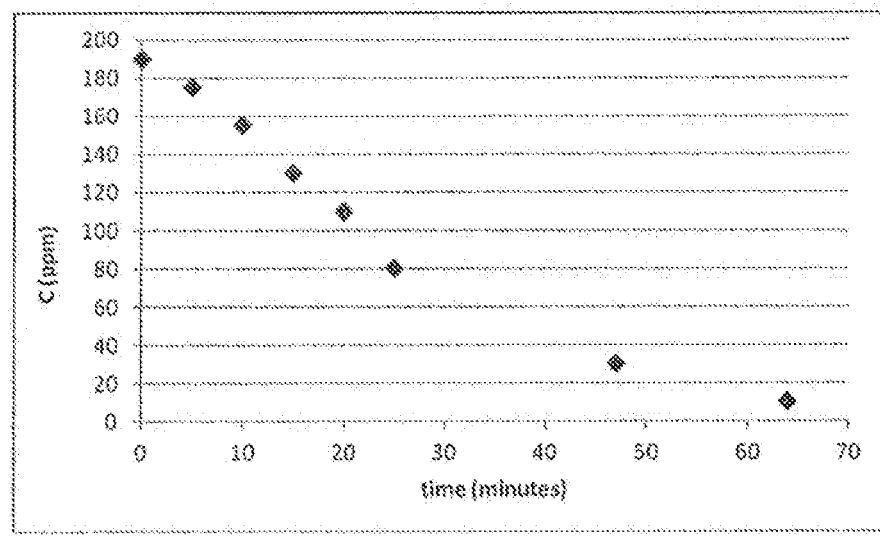
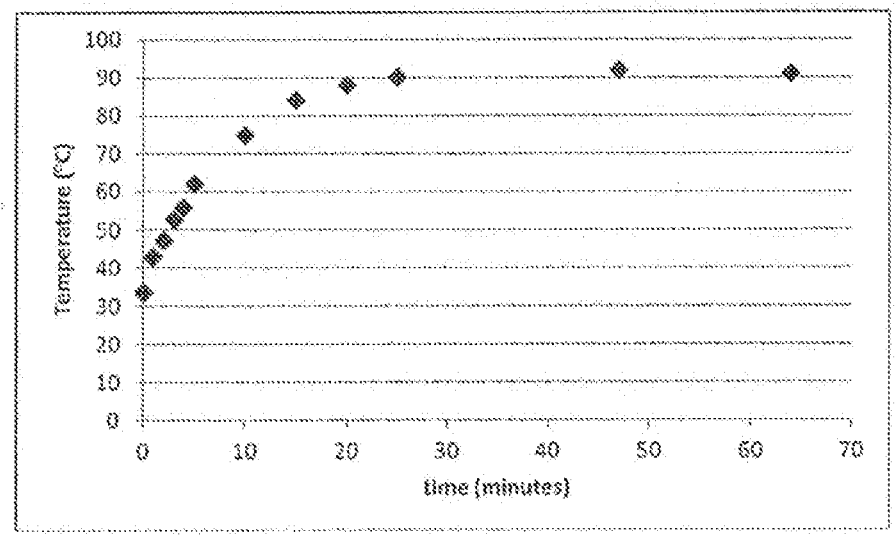
FIGURE 12

FIGURE 13
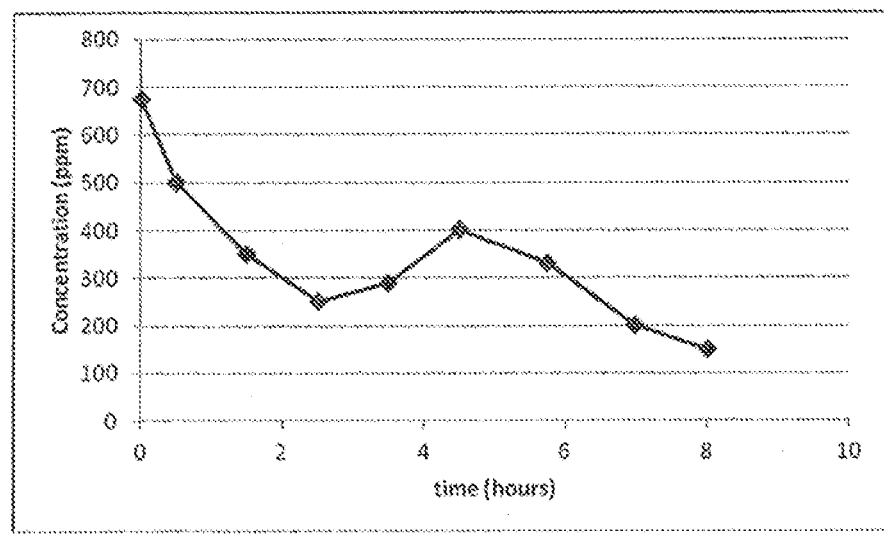
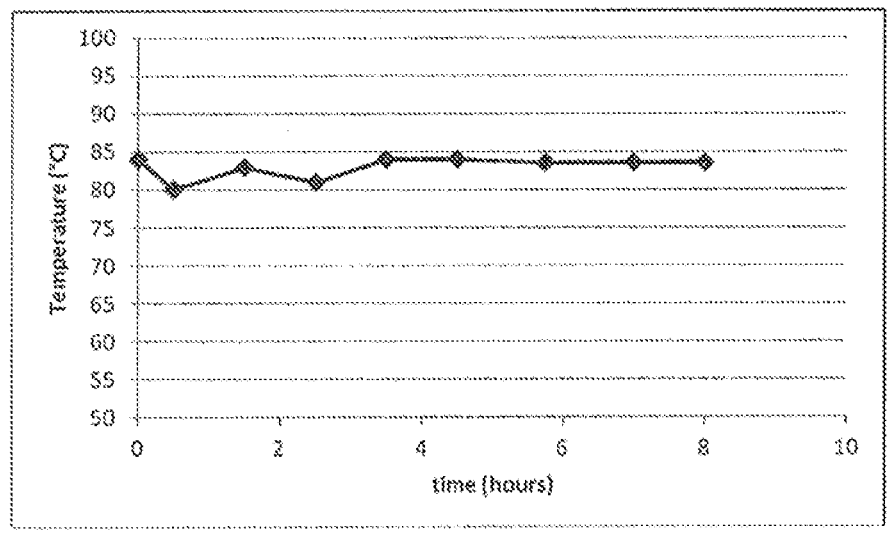
FIGURE 14

FIGURE 15
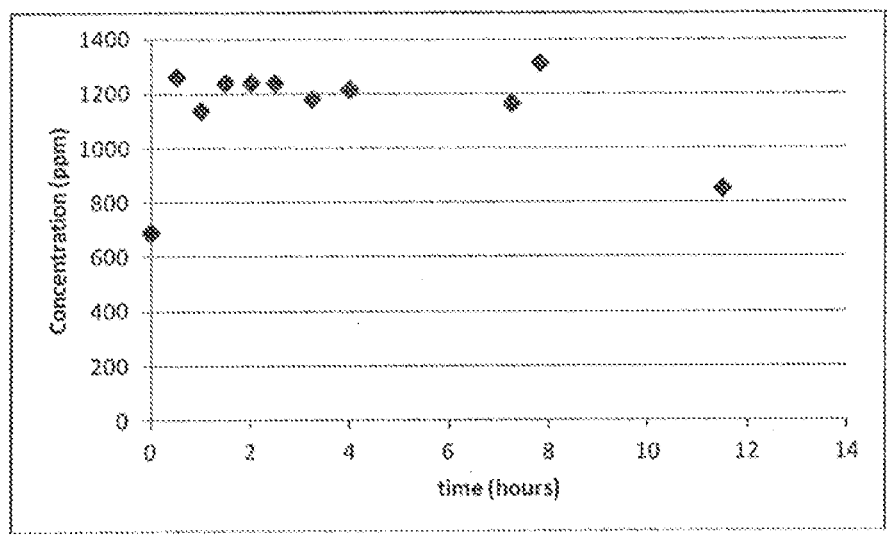
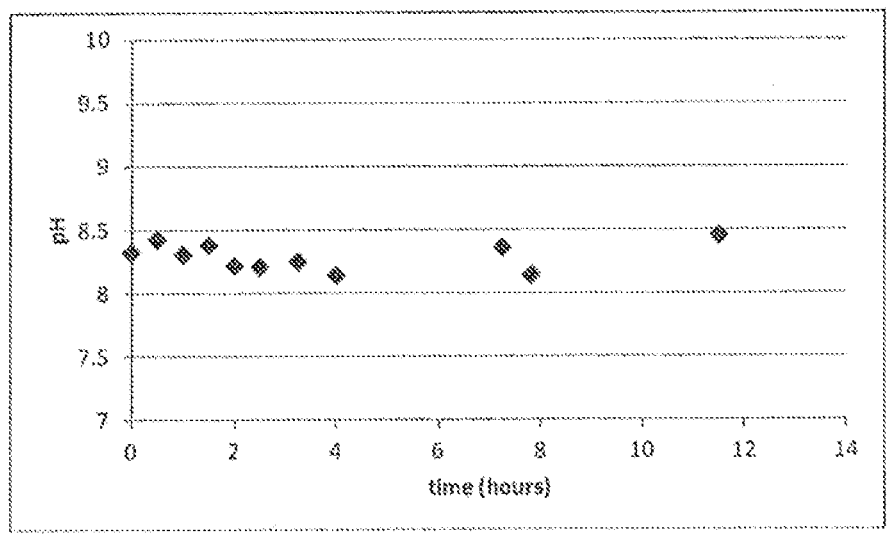
FIGURE 16

RECYCLING OF STYRENE BUTADIENE RUBBER AND LIKE MATERIALS

CROSS REFERENCE TO RELATED U.S. APPLICATION

This application claims the benefit of priority to U.S. Provisional Application No. 61/911,546, which was filed on Dec. 4, 2013, the contents of which are incorporated herein by reference.

FIELD OF INVENTION

The embodiments described herein relate to degrading vulcanized styrene butadiene rubber as a step in the recycling process.

BACKGROUND

Styrene butadiene rubber (SBR), having a structural formula as shown in FIG. 1, has the highest volume production in this country of any synthetic rubber. It is used extensively in the manufacture of automobile tires and tire-related products, as well as other products, including but not limited to sporting goods, hoses, footwear, flooring, wire and cable, raincoats, and rain boots. There is a significant need for effective recycling methods for SBR. The number of spent automobile tires discarded annually is estimated in the hundreds of millions. Hundreds of millions of tires from used automobiles are discarded annually, while the number of new automobile tires put into service each year, from new car production only, is estimated to exceed three hundred million.

SBR is synthesized by a process known as emulsion polymerization, which is known in the art. Polymerization of the styrene and butadiene copolymers is initialized in the aqueous phase to form a latex material at an approximate ratio of butadiene to styrene of about 3:1. The synthesized polymer then undergoes vulcanization to form sulfur cross-links, represented in FIG. 2, which help to impart upon the styrene butadiene base polymer the properties that are generally associated with rubber. After vulcanization, the rubber is compounded with additives which are also known in the art, to enhance properties of the rubber such as tensile strength, elongation resilience, hardness, and abrasion resistance. Table I presents typical compositions of SBR used for tire tread, in which PHR refers to parts per 100 parts of SBR base polymer.

TABLE I

EXAMPLE COMPOSITION OF SBR

| Ingredients | PHR |
|---|---|
| SBR Rubber | 100 |
| Carbon Black | 60 |
| Highly aromatic oil | 20 |
| Antiozonant | 1 |
| Antioxidant | 1.5 |
| Zinc Oxide | 3 |
| Stearic Acid | 1 |
| Retarder | 1 |
| Sulfur | 1.75 |
| Primary Accelerator | 1 |
| Secondary Accelerator | 0.2 |

SBR, and virtually all other vulcanized rubbers, are distinguishable from thermoplastic polymers such as polyethylene or polypropylene in that thermoplastic polymers can be melted and reused in other products, but vulcanized rubber cannot because of the interconnected network of polymer chains and sulfur cross-links formed during vulcanization. Consequently, SBR recycling is largely limited to macroscopic, non-chemical processing of the material so it can be used in other products, such as floor mats, blasting mats, traffic cone bases or soft pavement used in athletic tracks. However, these uses only account for less than 10% of all tires discarded annually. While there are still other isolated uses for spent tires, the substantial majority of tires consumed is sent to landfills, which are not an ideal solution for such large-scale disposal. Unquestionably, with the large and continuously growing market for SBR, and the inherent challenges associated with its disposal, there is a significant need for improved methods for tire recycling.

The properties of SBR, natural rubber, and neoprene rubber are well-known in the drinking water distribution industry, because such materials are used extensively, e.g., for gaskets and hoses at water treatment facilities. In view of various environmental standards and regulations, limiting the use of free chlorine for treating and disinfecting water, the use of chloramine compounds for these purposes has increased. Chloramine forms by reacting ammonia and chlorine, and is present as monochloramine ($NH_2Cl$), dichloramine ($NHCl_2$), and nitrogen trichloride ($NCl_3$).

A 2007 study published by the American Water Works Association (AWWA) reported on the degradation of SBR by monochloramine. In general, SBR was found to have moderate sensitivity to monochloramine. The findings of experiments performed at the highest temperatures and concentrations used in the study, i.e., 70° C. and 60 parts per million (ppm), respectively, were consistent with the SBR losing its sulfur cross-links, which provides SBR with its favorable mechanical properties but also restricts its recyclability. Thus, monochloramine's effect on SBR in the study suggested possible opportunities from a recycling perspective, although the study was carried out over 30 days and the level of degradation was incomplete. Accordingly, given the large scale recycling needs for automobile tires and other SBR-containing products, and recognizing the long time constraints associated with the AWWA study, there is a significant need for more robust, efficient and cost-effective methods of degrading and recycling SBR in shorter periods of time.

Further, other challenges are inherent to SBR, with respect to exposing this material to monochloramine with the objective of breaking the sulfur cross-linking bonds. For example, SBR is an amorphous polymer having a tightly packed sulfur cross-linked matrix of styrene-butadiene polymer strands, which impairs the diffusion of fluids through such a dense network. In this context, diffusion refers to the ability of a chloramine compound to penetrate the rubber matrix of SBR or like materials and react with the sulfur cross-links. Reaction kinetics (the rate at which reactants form products) governs the reaction between these compounds and the sulfur cross-links once the diffusion has occurred. Accordingly, the degradation of SBR and like materials is limited by the rate of diffusion, and the rate of diffusion is affected by the concentration of monochloramine at any given point in time. Consequently, there is a need to supply a steady and consistent concentration of monochloramine to the SBR, while overcoming the challenge created by the fact that monochloramine is thermodynamically unstable and decomposes spontaneously.

SUMMARY OF EMBODIMENTS

The descriptions and teachings herein recognize that monochloramine, with an amine group providing stability to a single chlorine atom, is less reactive than dichloramine and nitrogen trichloride and remains active in solution for longer periods. Their instability also affects the ability of dichloramine and nitrogen trichloride to diffuse, that is to penetrate the rubber matrix. Thus, even though it too is highly reactive, monochloramine is more stable and better able to penetrate the rubber matrix and react with the sulfur cross-links. However, while it is preferred, and in some embodiments the reaction conditions are set up to favor its formation, the scope of embodiments is not limited to monochloramine. Rather, the scope of embodiments includes not only monochloramine, but also dichloramine and nitrogen trichloride. Because it is the preferred form, though, the descriptions and teachings speak primarily to monochloramine, but are also applicable to the other chloramine compounds.

Present embodiments provide efficient and cost-effective use of monochloramine to degrade SBR and like materials, with such degradation potentially serving as a precursor step for recycling. The pertinent reactions are (1) the formation of monochloramine, which can be accomplished by combining aqueous sodium hypochlorite, NaOCl, and ammonium hydroxide (aqueous ammonia), $NH_4OH$, producing the chloramine species (mono-, di-, and tri-chloramine); and (2) the subsequent reactions between monochloramine and SBR by which the latter is degraded.

Monochloramine is associated with unfavorable thermodynamics at equilibrium, as demonstrated in Table II:

TABLE II

MONOCHLORAMINE EQUILIBRIUM CONDITIONS

| Property | Value |
| --- | --- |
| $\Delta G_{rxn}$ @ 25° C. | 115.29 kJ/mol |
| $K_{eq}$ | $6.18 \times 10^{-21}$ |

To overcome its thermodynamic instability, present embodiments provide a continuous flow of newly-formed monochloramine, thus maintaining a suitable concentration. Although temperature is important to reaction kinetics, and to diffusion rates, the present embodiments recognize that controlling the concentration of monochloramine is likely to have a greater effect on the degradation process than controlling temperature. Further, through modification of SBR into particulate matter, there is an increase in the surface area of the SBR exposed to monochloramine, thereby decreasing diffusion time significantly.

Other embodiments and alternatives are provided, which are useful to achieve a steady flow of fresh monochloramine into the reactor to maintain adequate concentration, to otherwise provide favorable conditions in the reactor including but not limited to temperature in order to maintain adequate concentration and activity of monochloramine, and to monitor concentration and determine when to add fresh monochloramine to the reactor. The material for the reactor can be any suitable container that is inert to the chloramines. In general, what is disclosed and claimed herein relates to overcoming the thermodynamic instability of monochloramine, which otherwise acts as a key constraint on any attempts to degrade SBR for recycling using such compounds. By doing so, monochloramine penetrates the rubber matrix of SBR through diffusion, without entirely decomposing, so it can degrade the SBR by reacting with the sulfur cross-links between polymer strands.

The following symbols/abbreviations are used in various places herein for brevity:

A=pre-exponential factor
$C_i$=concentration of species i, mol/L
$D_{AB}$=diffusivity of component A through component B, $cm^2/s$
$E_a$=activation energy, J/mol
G=Gibbs free energy, J/mol
H=enthalpy, J/mol
J=molar flux, mol/(area·time)
K=equilibrium constant
k=reaction rate, $min^{-1}$
M=molarity, mol/L
PHR=parts by weight of a component per 100 parts of SBR
PPM=parts by weight of a component per million parts of another component
R=universal gas constant, 8.314 J/mol K
$-r_i$=rate of disappearance of component i, mol/L s
S=entropy, J/(mol K)
T=temperature, ° C.
t=time
$\alpha$, $\beta$=reaction order parameters
$\Delta$=change in property, i.e. $\Delta S$, $\Delta H$, etc.

BRIEF DESCRIPTION OF THE DRAWINGS

The drawings and descriptions herein are to be understood as illustrative of steps, structures, chemicals, features and aspects of the present embodiments and do not limit the scope of the embodiments. The scope of the application is not limited to the precise arrangements or scales as shown in the drawings.

FIG. 1 is a structural formula for styrene butadiene rubber.

FIG. 2 shows sulfur cross-linkages of SBR polymer, with the sulfur atoms denoted by "S".

FIG. 3 is a graphical representation showing how the concentration of chloramine falls over time.

FIG. 4 provides a trendline plotting concentration against time as monochloramine decomposes.

FIG. 5 is a graphical representation of the reaction order and rate constant for the decomposition of monochloramine.

FIG. 6A is a graphical representation of the rate constant for monochloramine decomposition at 45° C. in the presence of Styrene Butadiene Rubber, based upon experimental results.

FIG. 6B is a graphical representation of the rate constant for monochloramine decomposition at 70° C. in the presence of Styrene Butadiene Rubber, based upon experimental results.

FIG. 6C is a graphical representation of the rate constant for monochloramine decomposition at 70° C., absent Styrene Butadiene Rubber, based upon experimental results.

FIG. 6D is a graphical representation of the rate constant for monochloramine decomposition at 92° C. in the presence of Styrene Butadiene Rubber, based upon experimental results.

FIG. 6E is a graphical representation of the reaction rate for the decomposition of monochloramine as a function of concentration at 45° C., in the presence of Styrene Butadiene Rubber, based upon experimental results.

FIG. 6F is a graphical representation of the reaction rate for the decomposition of monochloramine as a function of concentration at 70° C. in the presence of Styrene Butadiene Rubber, based upon experimental results.

FIG. 6G is a graphical representation of the reaction rate for the decomposition of monochloramine as a function of concentration at 70° C., absent Styrene Butadiene Rubber, based upon experimental results.

FIG. 6H is a graphical representation of the reaction rate for the decomposition of monochloramine as a function of concentration at 92° C., in the presence of Styrene Butadiene Rubber, based upon experimental results.

FIG. 9 is a graphical representation of monochloramine concentration plotted against time for a series of single run experiments that were conducted involving monochloramine solutions.

FIG. 10 is a graphical representation of temperature of the monochloramine solution plotted against time for an experiment.

FIG. 11 is a graphical representation of concentration of the monochloramine solution plotted against time for an experiment.

FIG. 12 is a graphical representation of temperature of the monochloramine solution plotted against time for an experiment.

FIG. 13 is a graphical representation of concentration of the monochloramine solution plotted against time for an experiment.

FIG. 14 is a graphical representation of temperature of the monochloramine solution plotted against time for an experiment.

FIG. 15 is a graphical representation of concentration of the monochloramine solution plotted against time for an experiment.

FIG. 16 is a graphical representation of pH of the monochloramine solution plotted against time for an experiment.

MULTIPLE EMBODIMENTS AND ALTERNATIVES

Figure 7:
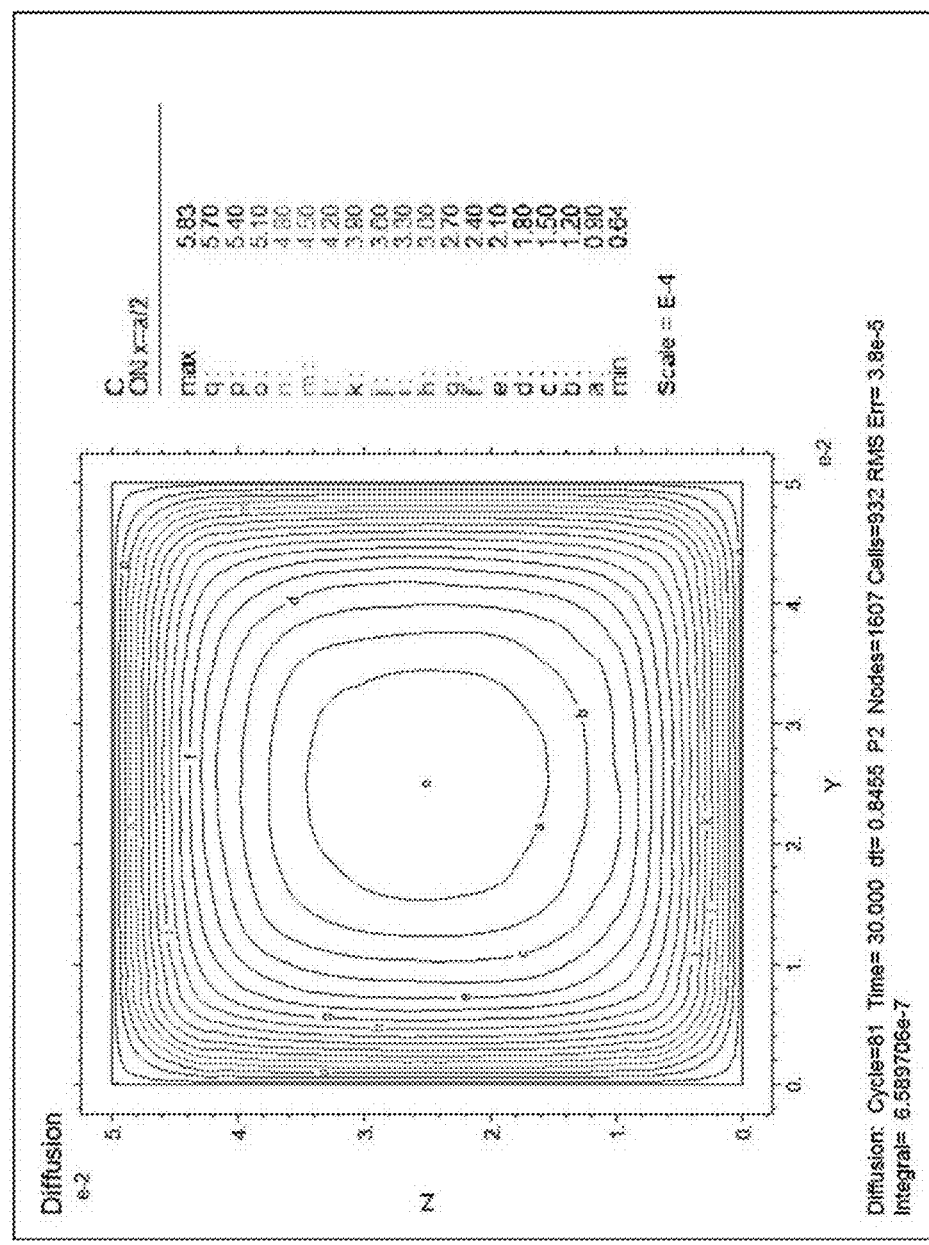
FIG. 7 depicts a center point of a particle of SBR corresponding to a steady state equilibrium concentration of a solution of aqueous chloramine across a cross-sectional slice of SBR.

According to multiple embodiments and alternatives provided herein, including processes and apparatuses, the degrading of SBR in a reactor comprises contacting particles of styrene butadiene rubber with monochloramine in aqueous solution under stirring to initiate the degradation process, and continuously providing fresh chloramine to the reactor to maintain a consistent supply of monochloramine at sufficient concentrations to degrade SBR over the course of hours as opposed to weeks or months, making it more practical at a larger industrial scale. In this sense, continuously refers to repeating the step of providing fresh chloramine at intervals of time while undegraded SBR remains in the reactor, in which the intervals can be regularly spaced apart or irregularly spaced. Alternatively, providing fresh chloramine involves determining a decomposition rate whereby chloramine undergoes a reverse reaction back to hypochlorite and ammonia species, and then determining a feed rate of fresh chloramine that is proportional to the decomposition rate. In some embodiments, the step of providing fresh chloramine to the reactor comprises adding hypochlorite and ammonia species in aqueous solution to the reactor.

In some embodiments, a flow regulator is provided and configured to control the flow of chloramine compound from the chloramine makeup supply vessel to the reaction vessel. A flow regulator may include one or more of a flow meter, e.g., a Venturi flow meter, and open/closable flow control valves positioned between a chloramine compound makeup vessel and the reactor.

Thermodynamics dictates what chemical components are formed at equilibrium conditions for a given reaction. All spontaneous chemical reactions or processes work to satisfy the second law of thermodynamics which states that entropy is always a positive value, which must increase according to Equation 1:

$$\Delta S_{total} = \Delta S_{system} + \Delta S_{surroundings} > 0 \tag{1}$$

The entropy of a system is also considered according to Equation 2:

$$\Delta G = \Delta H - T\Delta S \tag{2}$$

Thermodynamically, for a chemical reaction to occur spontaneously at a certain temperature, the change in Gibbs free energy for the reaction, $\Delta G_{rxn}$ must always be less than zero. Thus, it is worthwhile to consider chemical reactions forming monochloramine with reference to $\Delta G_{rxn}$, in view of the fact that chemical reactions tend toward states associated with lower values of G.

Reaction Kinetics for Monochloramine

In view of G and the equilibrium constant for a reaction, i.e., a mathematical expression of the relation between $\Delta G_{rxn}$ and the amounts of reactants and products in a system, one may predict the component concentrations of reactants (i.e., sodium hypochlorite and ammonium hydroxide) and the reaction products (including monochloramine) at equilibrium solutions, which is helpful in controlling the concentration of monochloramine in the system.

Sodium hypochlorite, NaOCl, can only be found as an aqueous ion mixture in water, which is a thermodynamically favored state of complete disassociation with $Na^+$ cations and $OCl^-$ anions surrounded by water molecules. The defining chemical reactions for the subject reaction are:

$$H_2O(l) \leftrightarrow H^+(aq) + OH^-(aq)$$

$$H^+(aq) + OCl^-(aq) \leftrightarrow HOCl(aq)$$

$$Na^+(aq) + OH^-(aq) \leftrightarrow NaOH(aq)$$

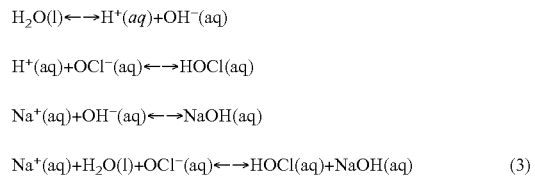

Ammonium hydroxide, $NH_4OH$, is the other reactant in the reaction to monochloramine, and itself is generally considered in terms of the equilibrium reaction:

All thermodynamic values as well as the equilibrium constants for these reactions favor, almost completely, the reactants which is consistent with hypochlorite (OCl anion) and ammonia ($NH_4^+$) exist as disassociated species in aqueous solution. Although the reactions are unfavorable for the formation of these species, however, low concentrations of them are still formed at equilibrium, and monochloramine does form when aqueous sodium hypochlorite is added to aqueous ammonia, according to the following reaction:

$$NH_3 + OCl^- \rightarrow NH_2Cl + OH^- \qquad (5)$$

For the formation reaction of monochloramine, the forward reaction is initially faster than the reverse reaction. However, the thermodynamic conditions force the reaction to move toward an equilibrium that satisfies the Gibbs free energy, moving toward the reverse reaction consistent with monochloramine's instability. This tendency is suggested in FIG. 3, in which monochloramine forms at the outset, but at a temperature of 70° C., the concentration falls quickly after formation and has almost disappeared within 60 minutes. Formation of monochloramine is thermodynamically unfavorable at all temperatures—even, by calculation, at temperatures greater than 2000° C. which would vaporize the species any way. Moreover, at higher temperatures, monochloramine becomes more unstable with increasing temperature.

Thus, while temperature and concentration are both relevant, concentration is more beneficial to control. This is also true given that, in addition to the reverse reaction, monochloramine also reacts to produce dichloramine according to the following reaction in aqueous solution:

$$H^+ + 2NH_2Cl^- \leftrightarrow NHCl_2 + NH_4^+ + H_2O \qquad (6)$$

In aqueous solution, nitrogen trichloride is produced from dichloramine according to the following reaction:

$$H^+ + 3NH_2Cl^- \leftrightarrow 2NCl_2 + NH_4^+ + H_2O \qquad (7)$$

Accordingly, embodiments are provided herein for favoring the formation of monochloramine over dichloramine and nitrogen trichloride. For example, in some embodiments, pH is maintained at alkaline levels to react with excess protons in the solution. A pH in a range of about 8-9 is suitable for these purposes, and in some embodiments pH is kept at about 8.3. Owing to the fact that a pH buffer alone may not prevent the pH from lowering below these levels, in some embodiments a solution containing a basic salt of an alkali metal (e.g., sodium hydroxide and potassium hydroxide) is added to the reactor to maintain a desired pH. In some embodiments, a feed line communicates between a vessel storing solution containing a basic salt of an alkali metal and a reactor where the SBR is degraded in aqueous solution of monochloramine. A pH meter is used to gauge when the pH comes near, or even drops below the stated range of 8-9, and at such time the solution from the vessel is added to the reactor by way of a feedline or similar conduit for delivery of a solution from one vessel to another.

Moreover, monochloramine itself is very reactive and eager to form new products with any other species present in the solution, not just protons. This reactivity is both the essential element of the ability of monochloramine to degrade SBR, as well as the factor that increases the difficulty of maintaining a stable system, and the reason why it becomes desirable to provide fresh monochloramine to the system to make up for decomposition or side reactions that reduce its concentration.

Making Up for Decomposition of Monochloramine

The rate of decomposition can be considered in order to maintain sufficient concentrations of monochloramine. If the tendency toward decomposition is quantified, then by correlation it becomes possible to either quantify an amount of monochloramine that must be formed and otherwise provided to the reactor in order to maintain suitable concentrations in the reactor or adjust the amount of monochloramine formed proportionally with the quantity that decomposes over time. The rate of formation of products or decomposition back to reactants is a function of the concentration of the reactants of that system. Accordingly, a rate law for a given reaction $aA + bB \rightarrow cC + dD$ can be written of the form:

$$-r_A = -\frac{dC_A}{dt} = kC_A^\alpha C_B^\beta \qquad (8)$$

where $$-r_A = \text{rate of disappearance of component } A\left(\frac{\text{mol}}{\text{min}}\right) \qquad (9)$$

$$\alpha + \beta = \text{overall reaction order} \qquad (10)$$

$$k = \text{reaction rate constant}\left(\frac{\text{mol}^{1-(\alpha+\beta)}}{L^{1-(\alpha+\beta)}\text{min}}\right) \qquad (11)$$

$$C_i = \text{component}_i \text{ concentration}\left(\frac{\text{mol}}{L}\right) \qquad (12)$$

Experientially, by running the reaction at a set of fixed temperatures and testing the change in concentration of reactants at certain time intervals over the course of the reaction, one can determine the rate of decomposition of monochloramine at different temperatures and concentrations. Raw concentration data is measured in ppm and then converted to mol/L by the conversion:

$$1 \text{ ppm Monochloramine} = 1.9424 \times 10^{-5} \frac{\text{mol}}{L} \qquad (13)$$

The results are then used to model the diffusion of monochloramine into SBR and to design processes and apparatuses for maintaining a desired concentration. A number of different methods, which are known to persons of ordinary skill in the art, can be used to determine rate law parameters from concentration versus time data. Information on the graphical, finite difference, integral, and polynomial methods can be found in Fogler's Elements of Chemical Reaction Engineering, Folger, H. S. *Elements of Chemical Reaction Engineering;* 4th ed.; Prentice Hall, 2005. A method similar to the polynomial method is used here. The data is plotted in Microsoft Excel and fitted with a trendline, as shown in FIG. 4.

$$\text{trendline equation} = C_{NH_2Cl} = 0.01237^{(-0.00971t)} \qquad (14)$$

$$-\frac{dC_{NH_2Cl}}{dt} = -(0.00971)(0.01237)^{(-0.00971t)} \qquad (15)$$

The trendline is differentiated with respect to time to determine the reaction rates at times corresponding to measured concentrations. The reaction rate is then plotted versus the measured concentration values and a trendline is fitted to determine the reaction rate constant and the order of reaction as seen in FIG. 5.

$$\text{trendline equation} = -r_{NH_2Cl} = 0.009632 \cdot C_{NH_2Cl} \quad (16)$$

Thus, by equation 16, the reaction is first order and the reaction rate constant approximately 0.0096 min$^{-1}$. This process was performed for concentration profiles at two other temperatures to determine the dependence of the rate constant on temperature. The results are presented in Table III, and the corresponding graphs based on the data are provided in FIGS. 6A-6H.

TABLE III

RATE CONSTANT TEMPERATURE DEPENDENCE

| T (° C.) | k (min$^{-1}$) |
|---|---|
| 45 | 0.001748 |
| 70 | 0.009632 |
| 92 | 0.061912 |

These figures provide the plot and trendline for reaction rate versus concentration, and with use of the data in Table III are useful for determining activation energy and the pre-exponential factor, which are parameters allowing for the prediction of reaction rate at any temperature between 45° C. and 92° C. To do so, the data in Table III is used with Equation 17:

$$\ln k = \ln A - \left(\frac{E_a}{R}\right)\left(\frac{1}{T}\right) \quad (17)$$

with the values in Table III plotted as ln k vs. (1/T), respectively. The results are presented in Table IV for Activation Energy (A) and Pre-Exponential Factor ($E_a$):

TABLE IV

| Factor | Value |
|---|---|
| $E_a$ | 72745 J/mol |
| A | 1.405 × 10$^9$ min$^{-1}$ |

These results are then the input in Equation 18, which in turn is useful for giving a reasonable approximation as to the diffusion of monochloramine through SBR and for designing a suitable reactor:

$$-r_{NH_2Cl} = (1.405 \times 10^9 \text{min}^{-1}) e^{\left(\frac{-72745 J/mol}{RT}\right)} C_{NH_2Cl} \quad (18)$$

Diffusivity of Monochloramine

The benefits of increasing the monochloramine concentration also affect the degradation of SBR, in that a higher concentration increases the diffusion rate. The degradation process of SBR is diffusion limited, which is affected by the concentration gradient, which is a change in concentration with respect to distance. The rate of diffusion of monochloramine through SBR must be adequate enough to support the degradation process within the tightly packed sulfur cross-linked matrix of SBR, and to do so within the time constraints dictated by the rapid rate of monochloramine decomposition. Again, depending on the temperature range, temperature may have less of an effect on diffusion than does concentration. Rather, rates of diffusion are increased by increasing the concentration gradient, which can be achieved by raising the concentration of monochloramine in the bulk liquid phase that surrounds each rubber particle immersed in solution.

Diffusivity through non-porous polymers is dependent on the type of polymer and, in the case of amorphous polymers such as SBR, whether it is glassy or rubbery. A diffusion coefficient or diffusivity, D, is a measure of the ability of the component of interest to diffuse through the other component. The diffusion coefficient of monochloramine into SBR is about 1.26×10$^{-9}$ cm$^2$/s for a solution of 30 mg/L (30 ppm) SBR at 45° C.

Modeling of the system considered boundary conditions for a cube-shaped particle of SBR surrounded on all sides by a solution of aqueous chloramine at 30 ppm. Results were gathered and analyzed for three different sized SBR cubes using software designed to model complex systems of partial differential equations, in this case FlexPDE 6 PDE Solutions Inc. from FlexPDE 6. Results are presented in FIGS. 7 and 8, respectively, representing a small cube of SBR with 0.05 mm sides having been exposed to a solution of monochloramine for a period of 30 days.

Figure 8:
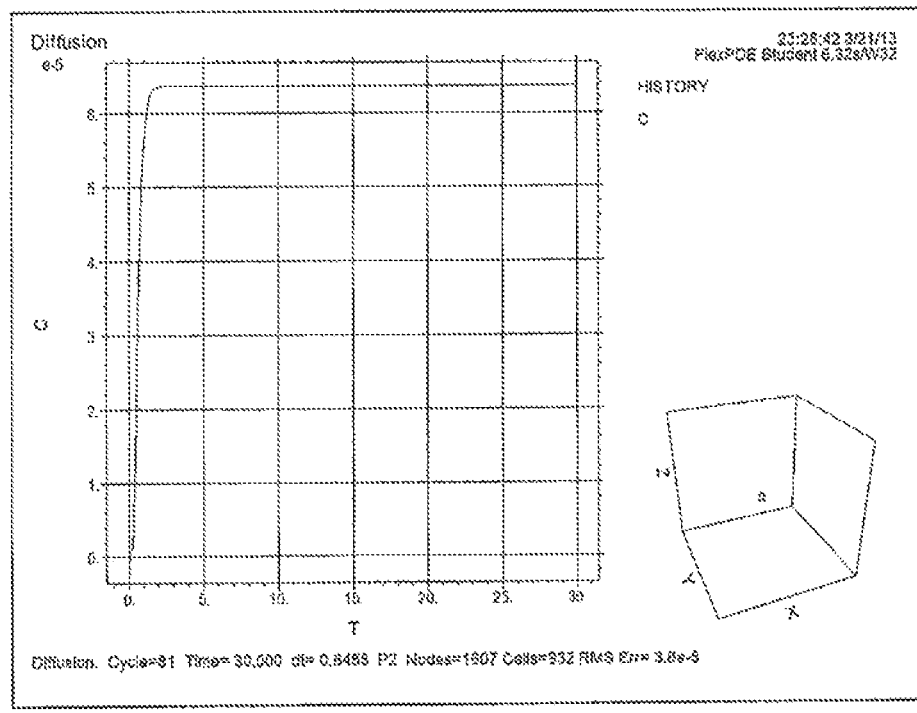
FIG. 8 provides a concentration profile of a monochloramine solution over a 30-day period at the center of a SBR cube.
Figure 17:
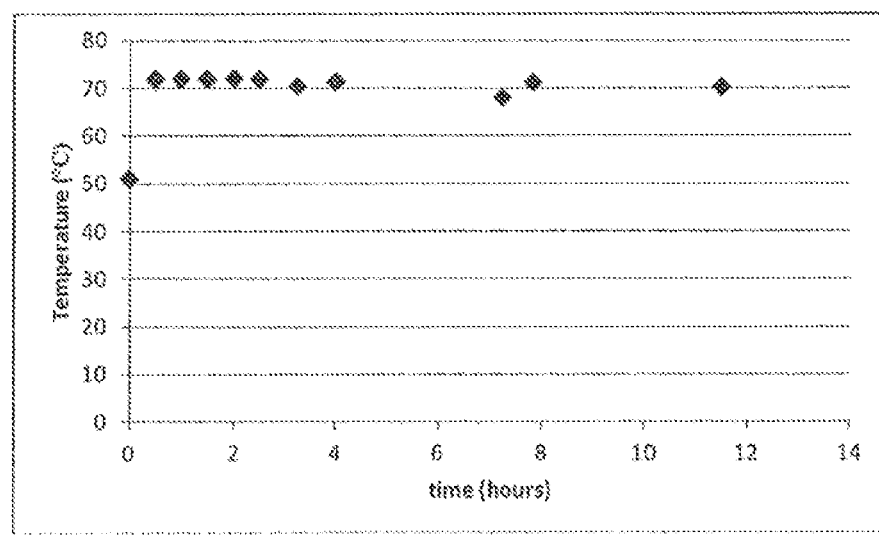
FIG. 17 is a graphical representation of temperature of concentration of the monochloramine solution plotted against time for an experiment.

In FIGS. 7 and 8, a small cube of SBR with 0.05 mm sides has been exposed to a solution of monochloramine for a period of 30 days. FIG. 7 depicts the equilibrium concentration across a cross-sectional slice made at the midpoint of the cube, while FIG. 8 is the concentration profile over the 30 day period for the point directly in the center of the cube. The model indicates that due to the decomposition of monochloramine, the rubber sample never attains the concentration of the bulk liquid phase, except at the very edge, even though the equilibrium point is reached at an early point of the test. The center point stays at a very low concentration during the entire run, as does most of the interior of the sample. Accordingly, the effect of cube size on diffusion time is presented in Table V, where the equilibrium concentration is shown at the center point of the sample with the time it takes to reach that point:

TABLE V

| Width (cm) | Equilibrium Concentration (mol/L) | PPM | Time (days) |
|---|---|---|---|
| 0.01 | 5.1 × 10$^{-4}$ | 26 | 0.2 |
| 0.05 | 6.4 × 10$^{-5}$ | 3.3 | 2.4 |
| 0.10 | 3.1 × 10$^{-6}$ | 0.15 | 3.6 |

Table V concerns the SBR particle size, and shows that for a particle size of about 1 millimeter (mm) in diameter or width, it takes 3.6 days for the center of that sample to reach a very low equilibrium concentration of 0.15 ppm. However, at a tenth the size, it takes 4.8 hours for the center point to reach a 26 ppm concentration, which is nearly equal to the bulk solution concentration. In some embodiments, particle size of SBR is reduced by mechanical force (e.g., sniping, grating, grinding), increasing the number of particles. In experiments, a grater was used, but more sophisticated tools are available, and the embodiments are not limited by the implement which is used to reduce the size of SBR particles. Ultimately, shape of the particles following reduction can be non-uniform and asymmetric, and will typically comprise spherical, elliptical, or cube-like structures.

SBR degrades layer-by-layer. By regular, and preferably continuous, stirring of the solution containing the monochloramine solution and SBR, the frictional action of the particles rubbing together in the solution help each layer as it degrades to detach from the remainder of the particle. Accordingly, in some embodiments the solution is stirred manually or automatically with a stirring implement, in ways which are known in the art. As desired, stirring can be performed on a continuous basis, or at regular intervals. Non-limiting examples of a stirring implement include, but are not limited to, a magnetic stir bar or a blade configured to rotate in a magnetic field as well as single- or multi-blade stirrers.

Following is a description of materials and methods used to degrade, extract, and characterize styrene butadiene tire rubber. In non-limiting fashion, this discussion is offered to further illustrate various embodiments according to the above teachings. However, it is to be understood that the discussion is illustrative only and not to be construed as limiting the scope of the subject matter described and claimed herein.

SBR was obtained from Lehigh Technologies Inc. with its corporate headquarters in Tucker, Ga. Approximately 50 grams of Polydyne-140 was obtained, which is derived from end-of-life truck tire tread and whole tire rubber, and has a 140 mesh powder with a surface area to volume ratio of 0.751 m2/g.

Monochloramine was synthesized using the ASTM D 6284 method. Sodium hypochlorite was diluted with water and reacted with aqueous ammonia to form chloramine and the pH was adjusted with phosphoric acid to achieve a pH in the range of 8-9. A boric acid pH 9 buffer was then added to stabilize the solution in desired pH range. The initial concentration of each solution was about 5000 ppm monochloramine.

The synthesized monochloramine was added to the 50 grams of Polydyne-140 rubber powder in a stainless steel container. The solution was reacted in the stainless steel container immersed in a hot water bath for periods ranging from 8-24 hours at a temperature of 50° C. After the period of reaction time, the degraded monochloramine solution (i.e., containing degraded SBR at high enough levels to reduce the activity of the monochloramine) was removed from the stainless steel reaction container via vacuum filtration and stored. Fresh monochloramine was then added to the stainless steel container containing the rubber and the process was repeated. For the span of 30 days, solutions were changed from between one and four times daily.

Filtered solutions from the process above were stored with open lids in a hot water bath at 50° C. to promote evaporation of the water from the samples. Once 50-70% evaporation was achieved across single containers, multiple evaporated solutions were combined together to form a solution of greater concentration. This more concentrated solution was then evaporated and the overall process repeated until the evaporated solution had a more viscous, wax-like, and yellowish appearance, consistent with a loss of properties that would be otherwise associated with vulcanized SBR.

Acetone was used to extract the SBR and to separate it from sodium chloride, a by-product of monochloramine decomposition. A suitable amount of acetone was added to the degraded, concentrated SBR solution until extraction equilibrium was reached and no more degraded SBR solution (degraded SBR mixed with water) could be absorbed by the acetone. At this point, the solutions (water and acetone) formed two separate phases with the water on the bottom and acetone on the top, and degraded SBR observable at the interface between the two phases. Then the top liquid phase containing acetone, water, and degraded SBR was carefully removed from the container, and it was boiled at approximately 60° C. with increasing temperature until the temperature reached 80° C., resulting in the removal of most of the acetone, and afterwards venting the remaining solution in a fume hood allowed virtually all the acetone to evaporate. At this point, the degraded SBR appeared as a film that had formed on top of the remaining water solution. This film was removed and placed in separate container.

The pure rubber sample that was recovered via the procedure above was characterized using Fourier Transform Infrared Spectroscopy (FTIR), Carbon NMR ($C^{13}$NMR), and Proton NMR ($H^1$NMR, or HNMR), in consideration of functional groups that one would expect to find in a styrene butadiene co-polymer chain, e.g., alkane, alkene, and aromatic shown in FIG. 1.

Generally, the spectra from these studies showed notable concentrations of alkanes (both C—H and C—C bonding), alkenes including (cis/trans, and vinyl carbon-carbon double bonds) and an aromatic ring corresponding to styrene, all of which are consistent with the existence of remaining carbon-carbon double bond sites available for re-vulcanization where sulfur atoms can bond to form cross links at those sites.

NMR is useful for characterizing functional groups and whole molecular structures by analyzing nuclear spin on atoms in a given sample, and works by exposing the sample to a magnetic field and measuring the frequency at which the atoms respond to the stimulation. The frequency and attendant chemical shift are dependent upon the electron environment surrounding the characterized atoms (hydrogen atoms for proton, or HNMR, and carbon atoms for carbon, or CNMR). The chemical shift of the sample is measured against the frequency of a reference compound, Tetramethylsilane, where the magnitude of the shift is determined by the electron affinity of the atoms surrounding the characterized atom. With NMR, as with FTIR, alkane, alkene, and aromatic functional groups are found at specific and unique chemical shift ranges. Also, with HNMR, areas under the peaks correspond to the relative concentration differences of the atoms within the sampled molecules.

Figure 18:
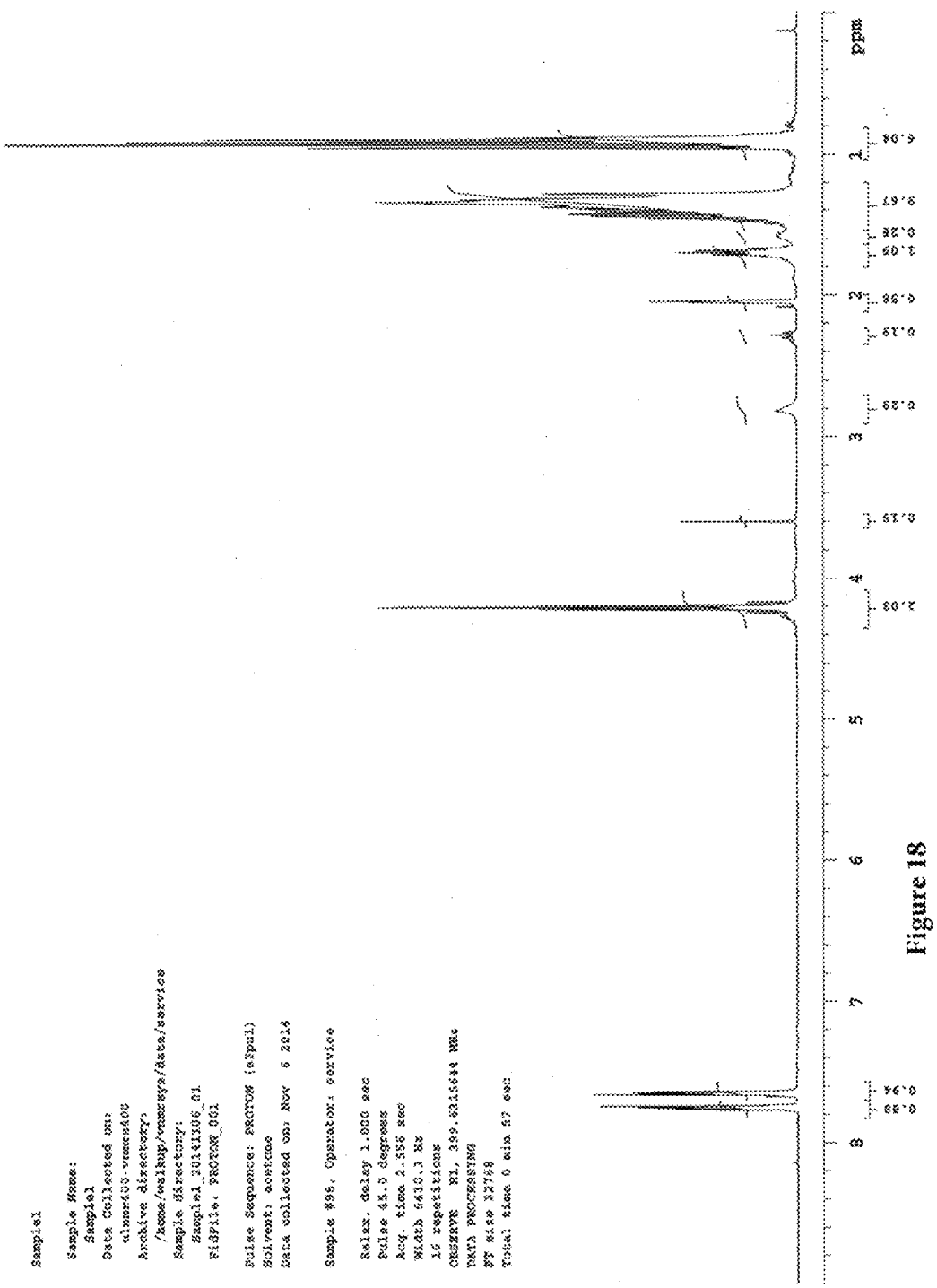
FIG. 18 is a proton NMR characterization of a polymeric substance recovered from multi-day experiments, according to multiple embodiments and alternatives.
Figure 19:
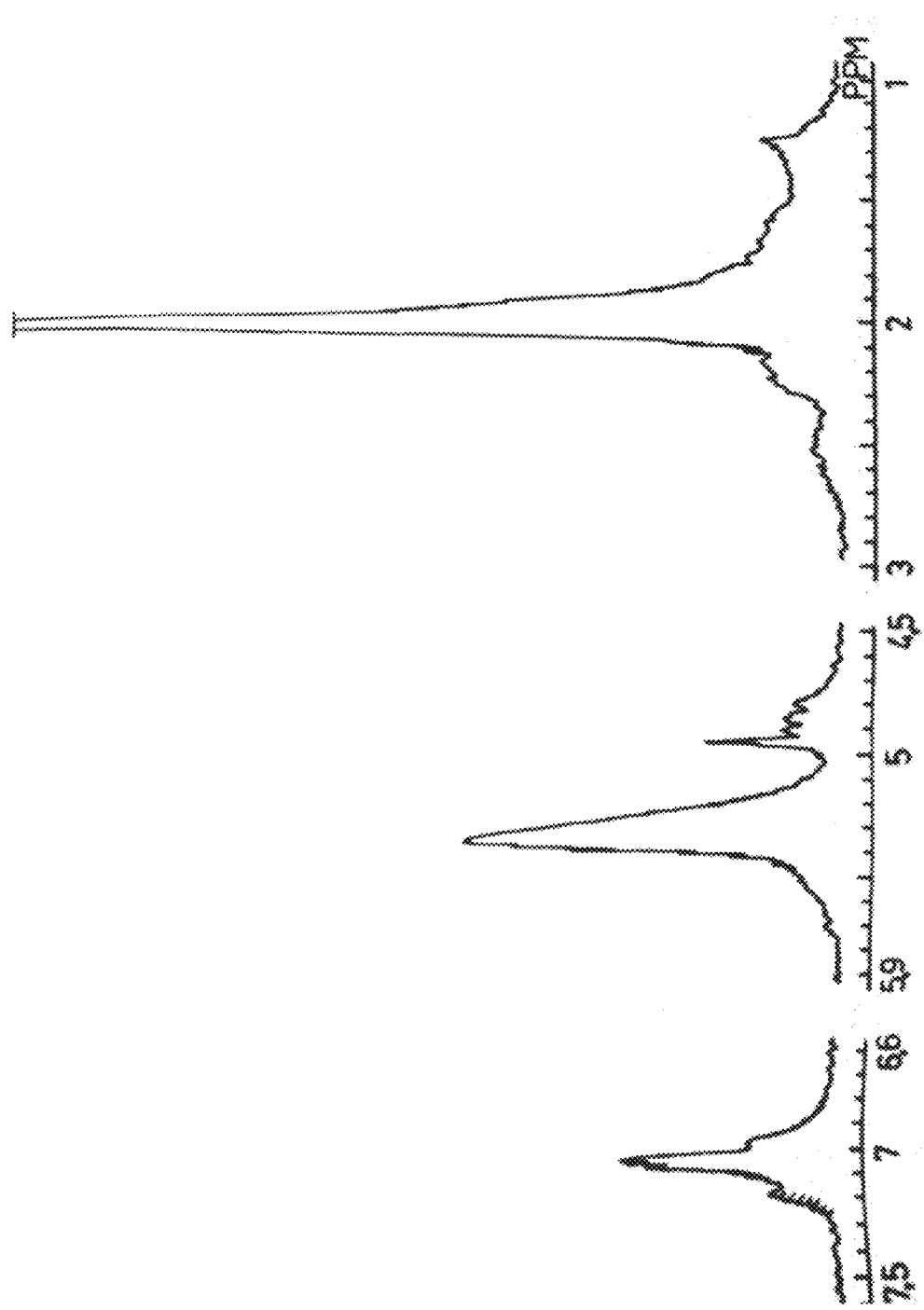
FIG. 19 is a published proton NMR characterization of SBR copolymer for comparison to the previous figure, illustrative of multiple embodiments and alternatives.

Accordingly, the degraded rubber sample was characterized by HNMR in a deuterated acetone solvent, and the resulting spectra are shown in FIG. 18, which are comparable to the proton NMR characterization of SBR copolymer shown in FIG. 19. Additionally, various generally accepted authorities, including *Spectral Data for Structure Determination of Organic Compounds* by Pretsch, et al. (Berlin: Springer-Verlag, 1989), *Nuclear Magnetic Resonance Spectroscopy* by Nelson, et al. (Upper Saddle River, N.J.: Prentice Hall, 2003), and *Proton and Carbon-13 NMR Spectroscopy* by Abraham, et al. (Hillview Gardens, UK: Heyden & Sons Ltd., 1980) list typical chemical shifts useful for characterizations, with general agreement on the ranges where alkanes, alkenes, and aromatics can be found. With HNMR, alkanes can be found over a range from 4.8 ppm to ≈2.1 ppm. More specifically, alkanes with the structure R—$CH_2$—R (where R is alkyl) are found from 1.1-1.8 ppm. This corresponds to the large peaks in FIG. 18 at 0.8-1.0 ppm (beginning of peak to end of peak), 1.25-1.5 ppm, and 1.6-1.8 ppm. The high area-under-curve values for these peaks (6.04, 9.67, and 1.09 respectively) represent the high number of alkane bonds in the backbone of the polymer repeat unit as seen in FIG. 5.

Alkene groups can be found in different ranges depending on the specific functional groups surrounding the carbon-carbon double bond. A hydrogen atom bounded to one of the carbons in the double bond can be found in the 3.8-7.8 ppm range (Pretsch, et al. lists a tighter 4.5-6 ppm range). This range corresponds to the peak from ≈4.15-4.35 ppm in FIG. 18. Additionally, hydrogen atoms bonded to a carbon atom adjacent to a double bond ($CH_2$—(C=C)) are found at ≈2 ppm (Pretsch, et al.), with possible overlap to peaks at 2.0 ppm and 1.6-1.8 ppm, respectively, as previously discussed in connection with the alkane groups.

Aromatic groups can be found in the 6.5-9 ppm range per Abraham, et al. and Nelson et al., whereas Pretsch et al. lists a tighter range of 6.8-7.5. This corresponds to the peaks at 7.6 and 7.8 ppm in FIG. 7. Prestch, et al. also indicates that an alkyl group bonded to an aromatic (CH-(ArC)), which is typical of the styrene bond, may be found at ≈2.9 ppm (Pretsch, et al.)., as further support that aromatic groups (i.e., styrene) are present within the compound.

Accordingly, the HNMR peaks for alkane, alkene, and aromatic groups shown in FIG. 18 are consistent with the ranges indicated by the literature, and with the reference characterization shown in FIG. 19.

Figure 20:
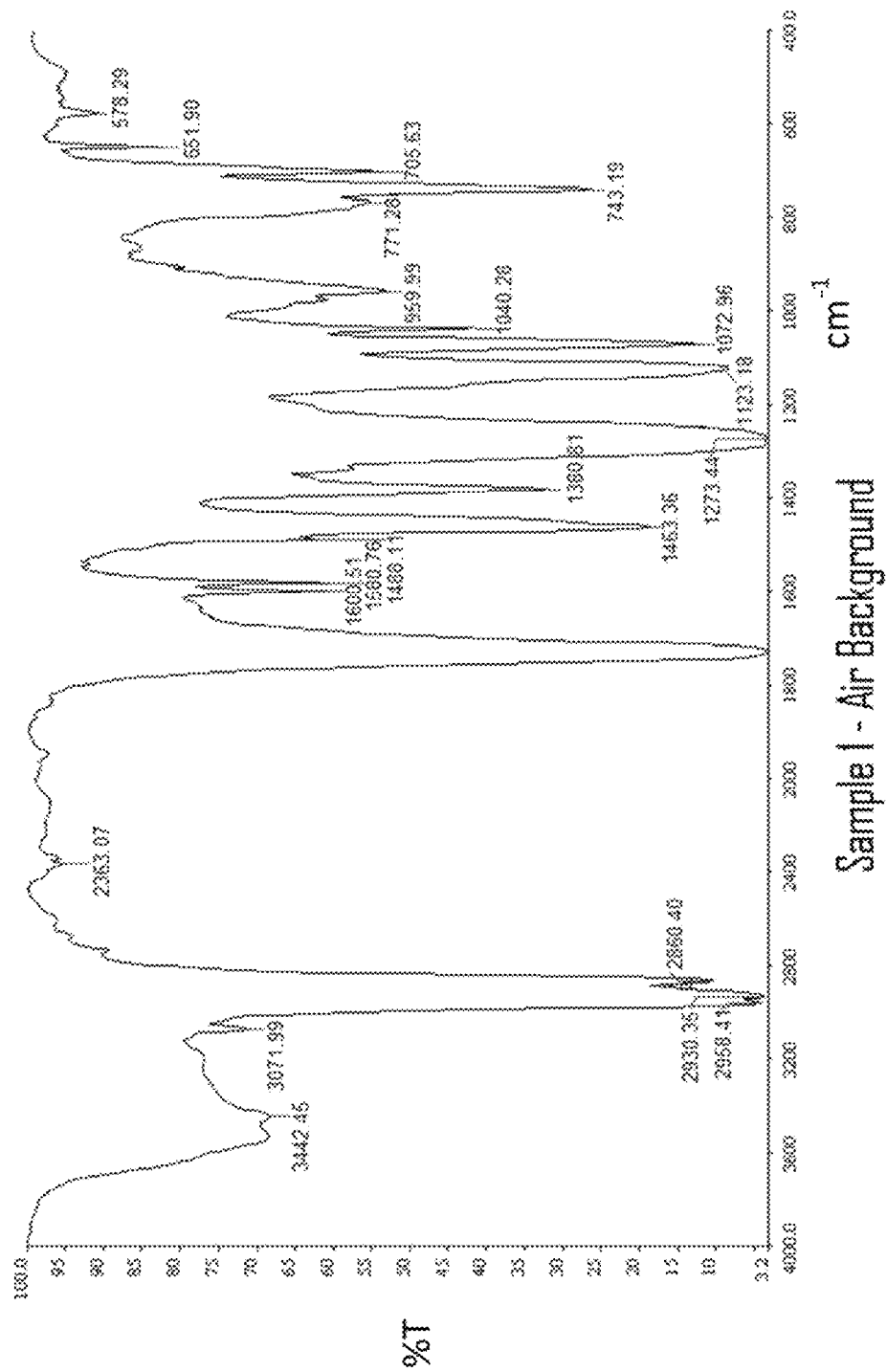
FIG. 20 is a Fourier Transform Infrared spectroscopy comparison of a polymeric substance recovered from multi-day experiments against known SBR spectra, according to multiple embodiments and alternatives.

FIG. 20 shows a FTIR spectroscopy comparison of the aforementioned degraded SBR sample against known SBR spectra. Various texts including Pretsch, et al. state that a C=$CH_2$ stretch from a vinyl group occurs at generally in the 3100-3000 $cm^{-1}$ range and more typically in the 3095-3075 $cm^{-1}$ range. This is depicted in FIG. 20 as a peak at 3071 $cm^{-1}$. According to *A Guide to the Complete Interpretation of Infrared Spectra of Organic Structures*, Roeges, et al. (New York, N.Y.: Wiley & Sons, 1994), the C=C stretch from the cis- and trans-double bonds typical of the SBR shown in FIG. 1 are typically found in the 1580 $cm^{-1}$-1590 $cm^{-1}$ range, coinciding with peaks at 1600 cm and 1580 cm peaks found FIG. 20. Furthermore, *Infrared Spectral Interpretation*, Smith, et al. (Boca Raton, Fla.: CRC Press LLC, 1999) states that the cis- and trans-C—H bending can be found at 690±50 $cm^{-1}$ (cis) and at 965±5 $cm^{-1}$ (trans-), respectively, coinciding with peaks seen at 705 $cm^{-1}$ (cis) and 965 $cm^{-1}$ (trans-) in FIG. 20.

Spectra for aromatics (styrene) can be found in similar regions as the cis- and trans-groups and in many cases the exact location depends on the overall functional arrangement of the polymer. Various texts and literature report styrene peaks at 1600, 1580, 1490, 727-761, and 695 $cm^{-1}$. (Roeges, et al. (1994); ISO WD 21561-2 (2013); *Determination of Styrene-Butadiene Rubber Composition By Attenuated Total Internal Reflection Infrared Spectroscopy*, Orlov A. S., Journal of Applied Spectroscopy, 2013.-1: Vol. Vol. 80 (2013)). In this case, three of the peaks have been already attributed to the butadiene double bonds. However, the occurrence of styrene and butadiene overlap is well supported in the literature. In FIG. 20, it is reasonable to attribute the presence of styrene to peaks at 1600 $cm^{-1}$, 1580 $cm^{-1}$, 1488 $cm^{-1}$, 743 $cm^{-1}$, and 705 $cm^{-1}$. The presence of styrene groups in the degraded SBR sample presents the structural similarity between the degraded SBR sample and the starting sample of SBR, consistent with a potential for re-vulcanization.

Other peaks of note seen in FIG. 20 are the spectra found at 2958 cm-1, 2930 cm-1, and 2958 cm-1, which are attributable to the numerous CH2 groups found in the butadiene backbone (Pretsch, et al., 1989).

Figure 21:
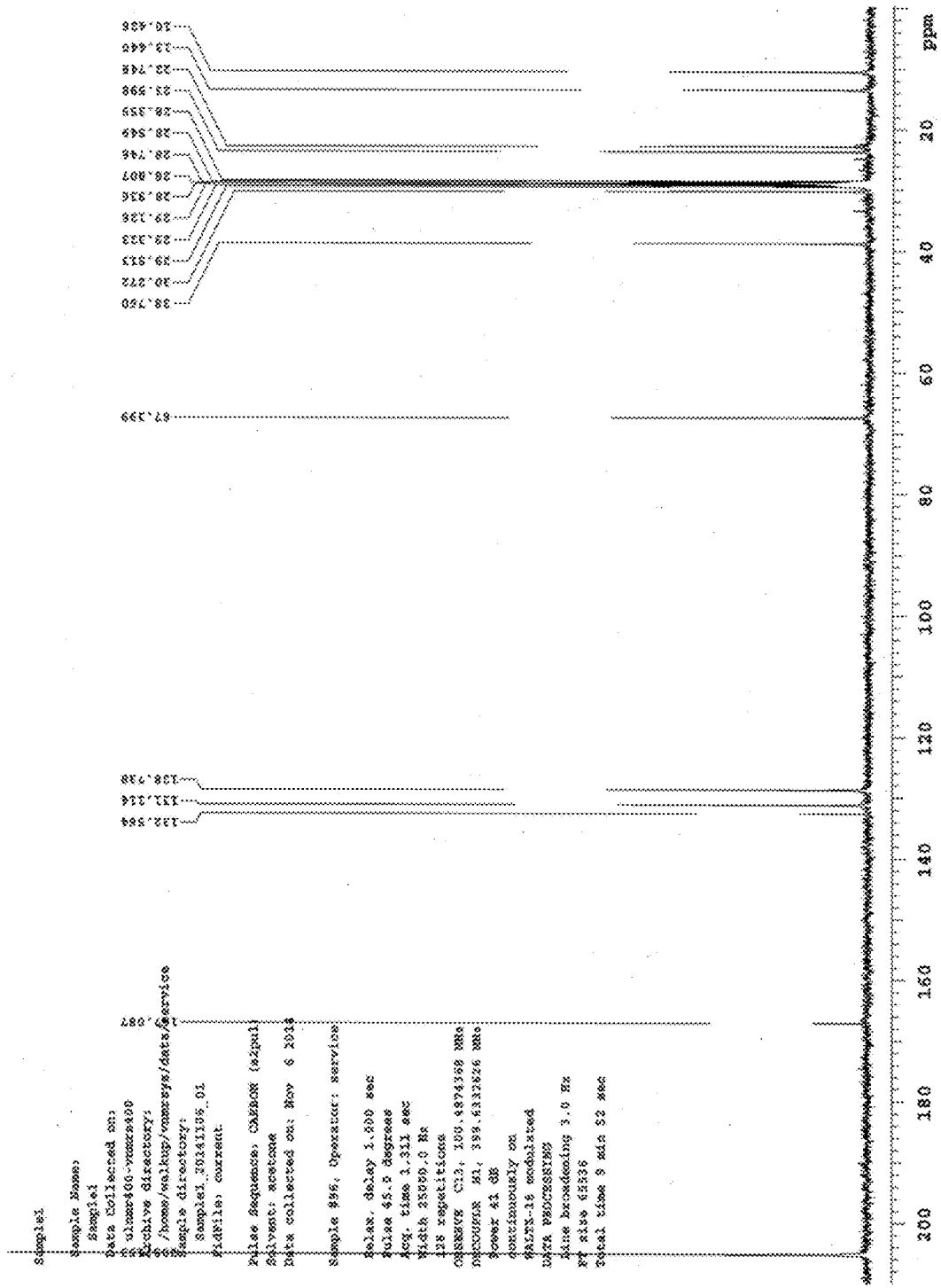
FIG. 21 is a carbon nuclear magnetic resonance (NMR) characterization of a polymeric substance recovered from multi-day experiments, according to multiple embodiments and alternatives.

Turning now to carbon NMR, the degraded rubber sample was diluted in deuterated acetone and characterized using carbon NMR. The results are presented in FIG. 21. Multiple authorities, including Pretsch, et al., Nelson, et al., and Abraham, et al. list functional groups within specific chemical shift ranges. For example, alkanes are found from 5-60 ppm, alkene groups are found between 100-150 ppm, while carbon atoms bonded directly to alkene carbons can be found from 10-40 ppm. Aromatics are also found in the 100-150 ppm range with carbons bonded directly to the aromatic group being found from 10-60 ppm. FIG. 21 shows multiple peaks in those ranges corresponding to alkane, alkene, and aromatic groups. Other peaks seen at 67 ppm, 167 ppm, and 205 ppm could be impurities in the sample or possibly carbons that have been shielded/deshielded based on the specific electron environment of the sample, recognizing that the exact structure of the starting sample of SBR is not known with precision. Notwithstanding, the carbon NMR provides additional support to indicate that alkane, alkene, and aromatic functional groups exist within the degraded sample, and is consistent with the other spectral results discussed here in this regard.

In general, then, the findings associated with these characterizations are consistent with a mechanism whereby monochloramine attacks the sulfur crosslinks in the vulcanized SBR matrix, but does not attack nor degrade the stronger carbon backbone, leaving the alkane, alkene (cis/trans and vinyl), and aromatic functional groups intact. These findings, added to the visual observation of high viscosity in the degraded SBR (a marker of high molecular weight), support the conclusion that the degraded SBR is intact and likely capable of being re-vulcanized and recycled.

All of the above descriptions are provided in relation to the degradation of SBR, having particular industrial and environmental relevance. Further, present embodiments are useful for and can be applied to degrade natural rubber, neoprene, and other rubbers and polymeric materials with sulfur cross-links and attendant mechanical properties, nor are they limited to the recycling of tires but can also be practiced with other products containing SBR or like materials that are degradable upon exposure to monochloramine.

It will be understood that the embodiments described herein are not limited in their application to the details of the teachings and descriptions set forth, or as illustrated in the accompanying figures. Rather, it will be understood that the present embodiments and alternatives, as described and claimed herein, are capable of being practiced or carried out in various ways. Also, it is to be understood that words and phrases used herein are for the purpose of description and should not be regarded as limiting. The use herein of "including," "comprising," "e.g.," "containing," or "having" and variations of those words is meant to encompass the items listed thereafter, and equivalents of those, as well as additional items.

Accordingly, the foregoing descriptions of several embodiments and alternatives are meant to illustrate, rather than to serve as limits on the scope of what has been disclosed herein. The descriptions herein are not intended to be exhaustive, nor are they meant to limit the understanding of the embodiments to the precise forms disclosed. It will be understood by those having ordinary skill in the art that modifications and variations of these embodiments are reasonably possible in light of the above teachings and descriptions.

What is claimed is:

1. A process for degrading styrene butadiene rubber in a reactor, comprising:
    contacting particles of styrene butadiene rubber with at least one chloramine compound in solution under stirring, the at least one chloramine compound being chosen from the group monochloramine, dichloramine, and nitrogen trichloride; and continuously providing fresh chloramine to the reactor.

2. The process of claim 1, wherein the step of providing fresh chloramine to the reactor comprises forming a solution of chloramine compound in a makeup supply vessel and adding the formed solution to the reactor.

3. The process of claim 1, wherein the temperature within the reactor is between about 45° C. and 92° C.

4. The process of claim 1, wherein the step of providing flesh chloramine to the reactor comprises adding hypochlorite and ammonia species in aqueous solution to the reactor.

5. The process of claim 2, further comprising regulating the flow of the chloramine compound between the chloramine makeup supply vessel and the reactor.

6. The process of claim 1, further comprising determining the concentration of chloramine in the reactor; comparing the concentration of chloramine in the reactor to a threshold value; and, if the concentration is below the threshold, adding fresh chloramine to the reactor.

7. The process of claim 1, wherein the at least one chloramine compound includes monochloramine, and further comprising favoring the formation of monochloramine over dichloramine and nitrogen trichloride when providing fresh chloramine to the reactor.

8. The process of claim 7, further comprising reducing the particle size of styrene butadiene rubber.

9. The process of claim 7, wherein the particle size of a substantial majority of styrene butadiene rubber particles is between about 0.5-1 millimeter.

10. The process of claim 9, wherein the particle size of a substantial majority of styrene butadiene rubber particles is no greater than about 0.5 millimeter.

11. The process of claim 7, wherein the step of favoring the formation of monochloramine over dichloramine and nitrogen trichloride comprises maintaining a pH in a range of about 8-9.

12. The process of claim 11, at a pH of about 8.3.

13. The process of claim 11, wherein the step of maintaining a pH in a range of about 8-9 comprises adding to the reactor a solution of a basic salt of an alkali metal.

14. The process of claim 1, further comprising determining a decomposition rate of at least one chloramine compound and determining a feed rate for providing fresh chloramine to the reactor proportional to the decomposition rate.

15. The process of claim 14, wherein the step of determining a decomposition rate of at least one chloramine compound comprises determining a concentration of the at least one chloramine compound as a function of reaction temperature.

16. The process of claim 1, wherein the at least one chloramine compound is dissolved in an aqueous solution.

17. A reactor for degrading styrene butadiene rubber, comprising:
    a reaction vessel for accommodating at least one chloramine compound;
    a chloramine makeup supply vessel communicating with the reaction vessel;
    a feedline configured to deliver a solution of a basic salt of an alkali metal to the reaction vessel;
    a flow regulator configured to control the flow chloramine compound from the chloramine makeup supply vessel to the reaction vessel; and
    an outlet for removing degraded chloramine compound solution from the reactor.

18. The reactor of claim 17, wherein the at least one chloramine compound is chosen from the group monochloramine, dichloramine, and nitrogen trichloride, and further comprising a pH meter for determining the pH of a solution.

19. The reactor of claim 18, further comprising a stirring implement.

20. The process of claim 1, further comprising subjecting the degraded styrene butadiene rubber to a revulcanizing process, thereby crosslinking adjacent polymer molecules of styrene butadiene rubber.

* * * * *